United States Patent [19]
Fujibayahsi et al.

[11] Patent Number: 5,407,748
[45] Date of Patent: Apr. 18, 1995

[54] RESIN COMPOSITION FOR AQUEOUS PAINT

[75] Inventors: Toshio Fujibayahsi, Hadano; Haruo Nagaoka, Hiratsuka, both of Japan

[73] Assignee: Kansai Paint Co., Ltd., Hyogo, Japan

[21] Appl. No.: 133,363

[22] Filed: Oct. 8, 1993

[30] Foreign Application Priority Data

Oct. 9, 1992 [JP] Japan .................. 4-297953
Jan. 29, 1993 [JP] Japan .................. 5-032538
Jan. 29, 1993 [JP] Japan .................. 5-032587

[51] Int. Cl.$^6$ .............................. B32B 15/08
[52] U.S. Cl. .................... 428/418; 523/404; 523/414; 525/407; 525/409
[58] Field of Search ............... 428/418; 523/404, 414; 525/407, 409

[56] References Cited

U.S. PATENT DOCUMENTS

| | | | |
|---|---|---|---|
| 4,001,101 | 1/1977 | Bosso et al. | 204/181 |
| 4,565,859 | 1/1986 | Murai et al. | 528/365 |
| 5,089,542 | 2/1992 | Nishida et al. | 525/117 |
| 5,091,446 | 2/1992 | Nishida et al. | 525/407 |

FOREIGN PATENT DOCUMENTS

| | | |
|---|---|---|
| 904202 | 7/1972 | Canada . |
| 0356970 | 3/1990 | European Pat. Off. . |
| 0444710 | 9/1991 | European Pat. Off. . |
| 51-130498 | 11/1976 | Japan . |
| 60-161973 | 8/1985 | Japan . |
| 60-166675 | 8/1985 | Japan . |
| 60-170620 | 9/1985 | Japan . |
| 62-135467 | 6/1987 | Japan . |
| 1306101 | 2/1973 | United Kingdom . |
| 1306102 | 2/1973 | United Kingdom . |
| 1327071 | 8/1973 | United Kingdom . |
| 1411249 | 10/1975 | United Kingdom . |

*Primary Examiner*—Melvyn I. Marquis
*Assistant Examiner*—D. Aylward
*Attorney, Agent, or Firm*—Wenderoth, Lind & Ponack

[57] ABSTRACT

A resin composition for aqueous paint contains, as main components, (A) a resin obtained by reacting a certain epoxy resin, an amine compound and a phenol compound and substantially containing neither primary or secondary amino group nor epoxy group; (B) a resin having phenolic hydroxyl groups and substantially containing neither primary nor secondary amino group, and (C) a resin compound having glycidyl groups or epoxy groups. The composition is excellent in dispersibility of each component and in storage stability. It has an extremely low heating loss of the coating film, and is excellent in smoothness, corrosion resistance, adhesion, etc.

46 Claims, No Drawings

RESIN COMPOSITION FOR AQUEOUS PAINT

This invention relates to a resin composition for aqueous paint, and, in particular, relates to a resin composition for aqueous paint such that when it is applied as a resin composition for cationic electrodeposition coating composition, it becomes unnecessary to use a blocked isocyanate compound (curing agent), an organotin compound (curing catalyst) or the like, which has so far been used. As a result, the heating loss of the coating film is reduced, catalyst-poisoning resistance, etc. are enhanced, and moreover the adhesion, weather resistance, low temperature curability, etc. of the coating film are improved.

Heretofore, as resin compositions for cationic electrodeposition coating composition, there have widely been used those containing as main components a polyamine resin (substrate resin) such as an amine addition epoxy resin and a blocked polyisocyanate compound (curing agent). These resin compositions are good in the corrosion resistance of the coating film, but have grave drawbacks, as intrinsic problems, for example that the curing initiation temperature of the coating film is high (170° C. or higher); when an organotin compound (curing catalyst) is used in order to lower the curing initiation temperature, the tin compound sometimes poisons the exhaust gas combustion catalyst of the kiln; when the coating film is heated at a high temperature in order to cure it, the blocked polyisocyanate compound thermally decomposes and gum, soot, etc. occur, and moreover the yellowing, bleeding and curing inhibition of the topcoat film are caused and weather resistance is lowered. Improvement on these points has strongly be desired.

On the other hand, cationic electrodeposition coating compositions using no curing agent and using a self-crosslinkable resin based on the ring opening reaction of the epoxy groups are proposed, for example, in GB 1306101, GB 1306102 and CA 904202 (Japanese Patent Publication No. 31736/1974), GB 1327071 (Japanese Patent Publication No. 23807/1974), GB 1411249 (Japanese Laid-Open Patent Publication No. 69896/1973), U.S. Pat. No. 4,001,101 (Japanese Laid-Open Patent Publication No. 13432/1972), etc., but it is difficult in all of them to make the bath stability of the electrodeposition coating composition and the curability of the coating film compatible. For example, glycidyl ether type polyepoxy compounds most general among them are excellent in the curability of the coating film but have a drawback of poor bath stability.

The present inventors had intensely studied for development of cationic electrodeposition coating compositions wherein the above drawbacks are obviated, and as a result they found that specific epoxy compounds wherein epoxy groups bind directly to the alicyclic skeleton are useful as a curing agent for cationic electrodeposition coating compositions substituting for the blocked polyisocyanate compounds, and proposed previously (EP-B-356970). However, it has been revealed that there are some points to be improved, for example that since the amine concentration is high, acid concentration in the bath lowers, and since the residual amine concentration in the cured coating film is high, anticorrosive properties against untreated steel plates is not sufficient.

The object of this invention is to provide a cationic electrodeposition coating composition free of the necessity of use of a blocked polyisocyanate compound or an organic tin compound, having a low amine concentration therein and excellent in anticorrosive properties against untreated steel plates, having good acid concentration stability in bathes, excellent in dispersibility in water and having only a small heating loss at the time of the curing of the coating film with heating.

According to this invention there is provided a resin composition for aqueous paint which contains as main components (A) a resin intrinsically containing neither a primary or secondary amino group nor an epoxy group and obtained by reacting an epoxy resin (A-1-1) having per molecule at least three epoxy group-containing functional groups represented by the following formula (I)

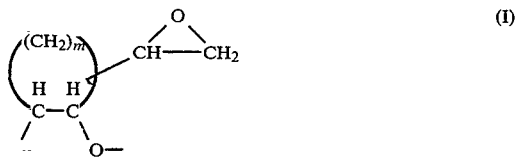

wherein m is an interger of 2 to 4, and/or a novolak phenol type glycidyl ether group-containing resin (A-1-2) having per molecule at least three glycidyl ether groups and represented by the following formula (II)

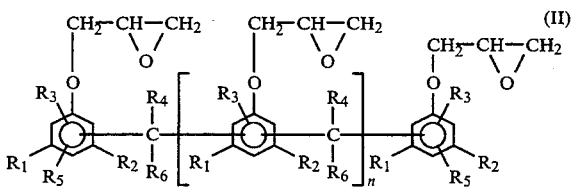

wherein
$R_1$ and $R_2$, which are the same or different, independently represent a hydrogen atom, an alkyl group having 1 to 8 carbon atoms, an aryl group, an aralkyl group or a halogen atom,
$R_3$ represents a hydrogen atom, an alkyl group having 1 to 10 carbon atoms, an aryl group, an aralkyl group, an allyl group or a halogen atom,
$R_4$ and $R_6$, which are the same or different, independently represent a hydrogen atom or an alkyl group having 1 to 4 carbon atoms,
$R_5$ represents a hydrogen atom, an alkyl group having 1 to 10 carbon atoms, an aryl group, an aralkyl group, an allyl group or a halogen atom, and
n is an integer of 1 to 38, a primary or secondary amine compound (A-2) having per molecule at least one primary hydroxyl group, and a phenol compound (A-3) having per molecule at least one phenolic hydroxyl group;

(B) a resin containing per molecule at least two phenolic hydroxyl groups or at least two in total of phenolic hydroxyl groups and primary hydroxyl groups originating in an alkanolamine, and intrinsically containing neither primary nor secondary amino groups; and (C) at least one component selected from the group consisting of a novolak phenol type glycidyl ether group-containing resin (C-1) represented by the following formula (III)

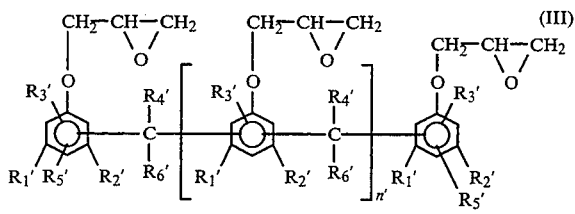

wherein
R'₁ and R'₂, which are the same or different, independently represent a hydrogen atom, an alkyl group having 1 to 8 carbon atoms, an aryl group, an aralkyl group or a halogen atom, R'₃ represents a halogen atom, an alkyl group having 1 to 10 carbon atoms, an aryl group, an aralkyl group, an allyl group or a halogen atom, R'₄ and R'₆, which are the same or different, independently represent a hydrogen atom or an alkyl group having 1 to 4 carbon atoms, R'₅ represents an alkyl group having 1 to 10 carbon atoms, an aryl group, an aralkyl group, an allyl group or a halogen atom, and n' is an integer of 1 to 38, an epoxy resin (C-2) having per molecule at least three epoxy group-containing functional groups represented by the following formula (IV)

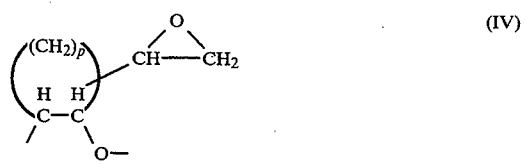

wherein p is an integer of 2 to 4, and a compound (C-3) having per molecule two or more glycidyl groups originating in glycidylamino groups directly binding to the carbon atom of the aromatic ring and represented by the following formula (V)

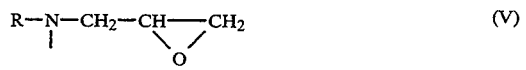

wherein R is a hydrogen atom or a glycidyl group.

The resin composition for aqueous paint of this invention is described in more detail below.

Component (A);

A resin having primary hydroxyl groups and cationic groups but intrinsically containing neither a primary or secondary amino group nor an epoxy group, obtained by reacting an epoxy resin (A-1-1) having per molecule at least three epoxy group-containing functional groups and represented by the above formula (I) and/or a novolak phenol type glycidyl ether group-containing resin (A-1-2) having per molecule at least three glycidyl ether groups and represented by the above formula (II), a primary or secondary amine compound (A-2) having per molecule at least one primary hydroxyl group, and a phenol compound (A-3) having per molecule at least one phenolic hydroxyl group.

Description is made first about the above component (A-1-1), component (A-1-2), component (A-2) and component (A-3).

Component (A-1-1):

An epoxy resin having per molecule at least three epoxy group-containing functional groups represented by the following formula

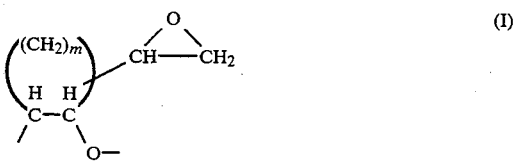

wherein m is an integer of 2 to 4.

As such epoxy resin components (A-1-1), there can be used those known per se and disclosed, for example, in Japanese Laid-Open Patent Publication No. 170620/1985, Japanese Laid-Open Patent Publication No. 135467/1987, Japanese Laid-Open Patent Publication No. 166675/1985, Japanese Laid-Open Patent Publication No. 161973/1985, U.S. Pat. No. 4,565,859, etc.

Further, the components (A-1-1) include those wherein the residue of the polymerization initiator component, namely the active hydrogen-containing organic compound residue binds to the terminus of the above formula (I), and as examples of the active hydrogen-containing organic compound which is its precursor, there can, for example, be mentioned alcohols, phenols, carboxylic acids, amines, thiols, etc.

Among them, alcohols may either be monohydric alcohols or polyhydric alcohols including dihydric or higher alcohols, and, specifically, there can be exemplified aliphatic monohydric alcohols such as methanol, ethanol, propanols, butanols, pentanols, hexanols and octanols; aromatic monohydric alcohols such as benzyl alcohol; polyhydric alcohols such as ethylene glycol, diethylene glycol, triethylene glycol, polyethylene glycol, propylene glycol, dipropylene glycol, 1,3-butanediol, 1,4-butanediol, pentanediols, 1,6-hexanediol, neopentyl glycol, oxypivalic acid neopentyl glycol ester, cyclohexanedimethanol, glycerol, diglycerol, polyglycerol, trimethylolpropane, trimethylolethane, pentaerythritol and dipentaerythritol; etc.

As phenols, there can, for example, be mentioned phenol, cresol, catechol, pyrogallol, hydroquinone, hydroquinone monomethyl ether, bisphenol A, bisphenol F, 4,4'-dihydroxybenzophenone, bisphenol S, phenol resins, cresol novolak resins, etc.

As carboxylic acids, there can be exemplified formic acid, acetic acid, propionic acid, butyric acid, fatty acids from animal and vegetable oils, fumaric acid, maleic acid, adipic acid, dodecanedioic acid, trimellitic acid, pyromellitic acid, polyacrylic acid, phthalic acid, isophthalic acid, terephthalic acid, etc., and there can also be used compounds having both hydroxyl groups and carboxyl groups such as lactic acid, citric acid and oxycaproic acid.

Further, as other compounds having active hydrogen(s), there can be used polyvinyl alcohols, partial hydrolyzates of polyvinyl acetates, starches, cellulose, cellulose acetate, cellulose acetate butyrate, hydroxyethylcellulose, allylpolyol resins, styrene-allyl alcohol copolymer resins, styrene-maleic acid copolymer resins, alkyd resins, polyester polyol resins, polycaprolactone polyol resins, etc. Further, compounds having active hydrogen(s) may have an unsaturated double bond together with the active hydrogen(s) in the skeleton, and may be those having such a structure that the double bond is epoxidized.

A component (A-1-1) can, for example, be obtained by subjecting a vinylcycloalkene oxide represented by the formula (VI)

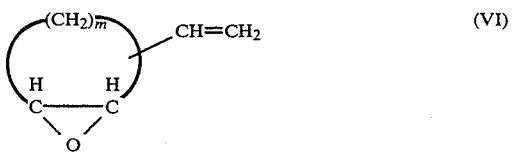

wherein m is an integer of 2 to 4, for example, 4-vinylcyclohexene-1-oxide, either alone or in coexistence with another epoxy group-containing compound, to ring opening (co)polymerization through epoxy groups contained therein, using the above active hydrogen-containing organic compound as the initiator, to form a polyether resin, and then epoxidizing vinyl groups existing in the side chains of the resin and originating in the above vinylcycloalkene oxide, with an oxidizing agent such as a peroxide or a hydroperoxide or the like, to introduce a functional group represented by the above formula (I).

4-vinylcyclohexene-1-oxide can, for example, be obtained by partially epoxidizing with peracetic acid vinylcyclohexene obtained by dimerization reaction of butadiene. Further, vinylcyclopentene-1-oxide or vinylcyclobutene-1-oxide can be obtained by partially epoxidizing vinylcyclopentene or vinylcyclobutene with peracetic acid.

As for other epoxy group-containing compounds, there is no particular limitation so long as they are compounds having an epoxy group, but compounds having one epoxy group in one molecule are preferred in view of their preparation, and, specifically, there can be mentioned α-olefin epoxides represented by the formula

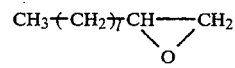

wherein L is an integer of 2 to 25, such as ethylene oxide, propylene oxide and butylene oxide; oxides of unsaturated compounds such as styrene oxide; glycidyl ethers of compounds having a hydroxyl group such as allyl glycidyl ether, 2-ethylhexyl glycidyl ether, methyl glycidyl ether, butyl glycidyl ether and phenyl glycidyl ether; glycidyl esters of organic acids such as fatty acids; etc.

Further, cyclic epoxy group-containing compounds represented by the following formulae (1) to (12) can also be used as other epoxy group-containing compounds.

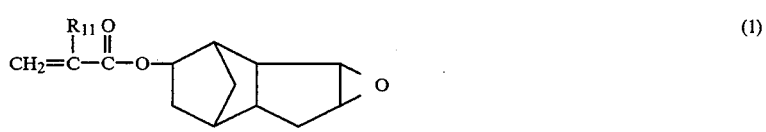 (1)

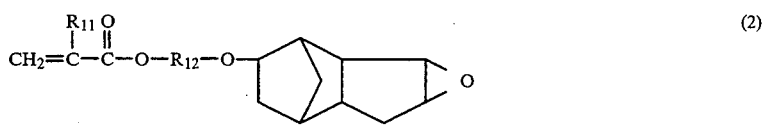 (2)

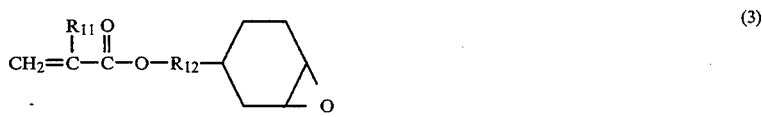 (3)

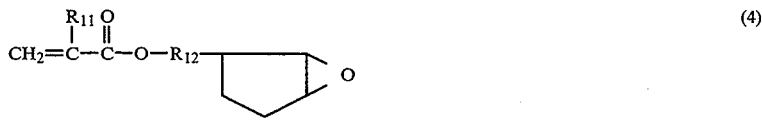 (4)

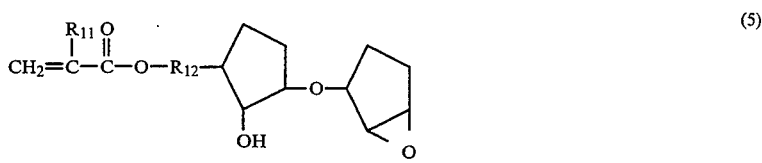 (5)

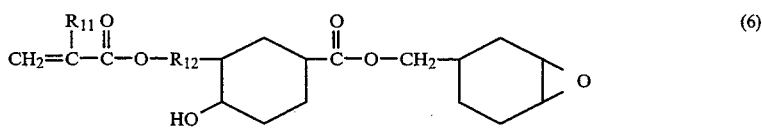 (6)

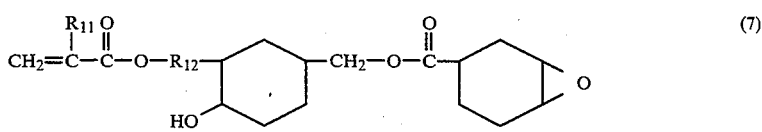 (7)

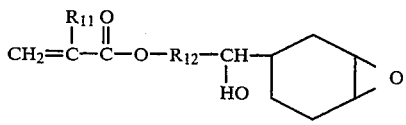 (8)

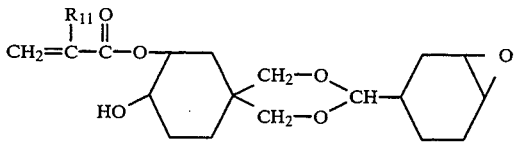 (9)

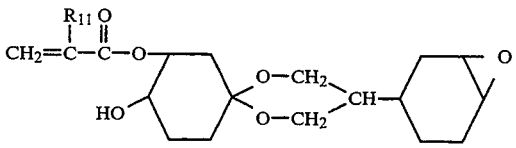 (10)

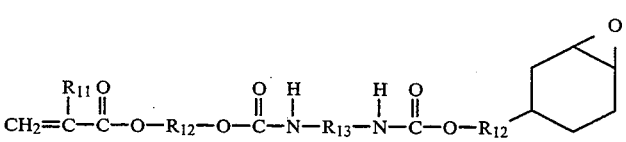 (11)

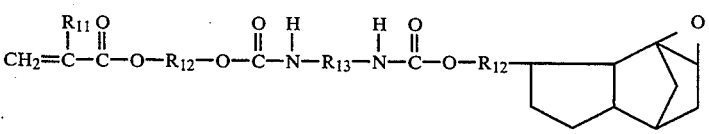 (12)

In each of the above formulae, $R_{11}$ represents a hydrogen atom or a methyl group, $R_{12}$ represents a divalent aliphatic saturated hydrocarbon group having 1 to 6 carbon atoms, and $R_{13}$ represents a divalent hydrocarbon group having 1 to 10 carbon atoms.

In the above, as the divalent aliphatic saturated hydrocarbon group having 1 to 6 carbon atoms represented by $R_{12}$, there can be mentioned a straight-chain or branched alkylene group such as, for example, a methylene, ethylene, propylene, tetramethylene, ethylethylene, pentamethylene or hexamethylene group. Further, as the divalent hydrocarbon group having 1 to 10 carbon atoms represented by $R_{13}$, there can, for example, be mentioned a methylene, ethylene, propylene, tetramethylene, ethylethylene, pentamethylene, hexamethylene, polymethylene, phenylene,

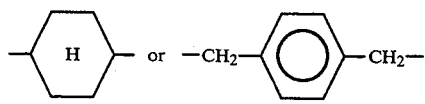

group, or the like.

Further, there can also, for example, be used as other epoxy group-containing compounds compounds represented by the following general formula (VII)

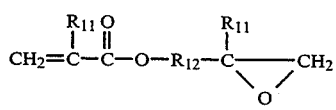 (VII)

wherein $R_{11}$ and $R_{12}$ have the same meanings as defined above, for example, glycidyl acrylate and glycidyl methacrylate; and alicyclic unsaturated compounds accessorily produced by partial epoxidation of vinylcyclohexene and represented, for example, by the following formula (VIII)

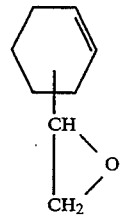 (VIII)

Further, 4-vinylcycloheptene (vinylnorbornene), etc. can also be used.

The ring opening (co)polymerization reaction of epoxy groups of the vinylcycloalkene oxide of the above formula (VI), for example 4-vinylcyclohexene-1-oxide alone or in coexistence of another epoxy group-containing compound is preferably carried out in the presence of the active hydrogen-containing organic compound using a catalyst. As usable catalysts, there can, for example, be mentioned amines such methylamine, ethylamine, propylamine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH; Lewis acids such as $BF_3$, $ZnCl_2$, $AlCl_3$ and $SnCl_4$ or their complexes; and organometallic compounds such as triethylaluminum and diethylzinc.

These catalysts can be used in the range of 0.001 to 10 wt. %, preferably 0.1 to 5 wt. % based on the reactants. Temperature for the ring opening (co)polymerization is generally $-70°$ to $200°$ C., preferably $-30°$ to $100°$ C. The reaction can be carried out using a solvent and it is preferable to use as the solvent an ordinary organic solvent having no active hydrogen.

By epoxidizing the vinyl groups contained in the side chains of the thus obtained polyether resin (ring opening (co)polymer), the functional group represented by the above structural formula (I) can be introduced to obtain a component (A-1-1). The epoxidation can be carried out using a peracid, a hydroperoxide or the like. There can be used as peracids, for example performic acid, peracetic acid, perbenzoic acid, pertrifluoroacetic acid or the like, and as hydroperoxides, for example hydrogen peroxide, tert-butyl peroxide, cumene peroxide or the like. The epoxidation reaction can, if necessary, be carried out using a catalyst.

By epoxidizing the vinyl group in the vinylalkene oxide of the formula (VI), for example 4-vinylcyclohexene-1-oxide, the functional group represented by the above structural formula (I) is formed. When the above alicyclic oxirane group-containing compound or the like coexists as another epoxy group-containing compound in this epoxidation reaction, the vinyl group contained in the compound is sometimes epoxidized, too.

The use or non-use of a solvent or reaction temperature in the epoxidation reaction can appropriately be adjusted depending on an apparatus to be used or the physical properties of raw materials.

Commercial products can also be used as such components (A-1-1), and, for example, EHPE 3150 (trade name, produced by DAICEL CHEMICAL INDUSTRIES, LTD.) can be mentioned. This is one obtained by epoxidizing the vinyl groups in the ring opening polymer of 4-vinylcyclohexene-1-oxide, and has an average polymerization degree of 4 to 15.

The amount of the epoxy group-containing functional group represented by the structural formula (I) may be such that three or more such functional groups are contained per molecule of the component (A-1-1), and is, in terms of epoxy equivalent, in the range of preferably 140 to 1,000, more preferably 170 to 300.

Component (A-1-2):

Novolak phenol type glycidyl ether group-containing resins having at least three glycidyl ether groups per molecule and represented by the following formula (II)

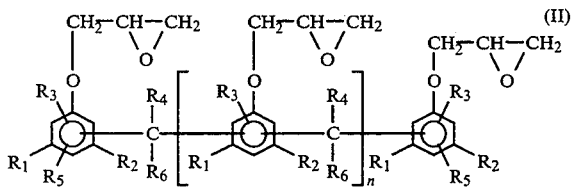

wherein $R_1$ and $R_2$, which are the same or different, independently represent a hydrogen atom, an alkyl group having 1 to 8 carbon atoms, an aryl group, an aralkyl group or a halogen atom;

$R_3$ represents a hydrogen atom, an alkyl group having 1 to 10 carbon atoms, an aryl group, an aralkyl group, an allyl group or a halogen atom;

$R_4$ and $R_6$, which are the same or different, independently represent a hydrogen atom or an alkyl group having 1 to 4 carbon atoms;

$R_5$ represents a hydrogen atom, an alkyl group having 1 to 10 carbon atoms, an aryl group, an aralkyl group, an allyl group or a halogen atom; and n is an integer of 1 to 38.

In the above general formula (II), "alkyl group" is straight chain or branched chain, and includes, for example, methyl, ethyl, propyl, isopropyl, butyl, isobutyl, sec-butyl, tert-butyl, pentyl, isoamyl, hexyl, heptyl, octyl, 2-ethylhexyl, nonyl, decyl, etc. groups. "Aryl group" may be either monocyclic or polycyclic, and includes, for example, phenyl, naphthyl, etc. groups. In particular, a phenyl group is preferred. "Aralkyl group" is an aryl-substituted alkyl group of which the aryl and alkyl moieties have the aforementioned meanings, respectively. Examples thereof include, for example, benzyl, phenethyl, etc. groups, with a benzyl group being preferred.

"Halogen atom" includes a fluorine atom, a chlorine atom, a bromine atom and an iodine atom.

"Organic group having a glycidyloxyphenyl group" which can be represented by $R_4$ and/or $R_6$ is an organic group having a group represented by formula

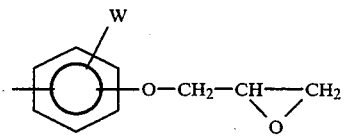

wherein W is a hydrogen atom or alkyl group having 1 to 10 carbon atoms. Preferred examples of the organic group include, for example, glycidyloxyphenyl, glycidyloxyphenylmethyl, glycidyloxyphenylethyl, glycidyloxyphenylpropyl, glycidyloxyphenylbutyl, glycidyloxyphenylpentyl, glycidyloxyphenylhexyl, glycidyloxyphenyloctyl, glycidyloxyphenylnonyl, etc. groups.

In the general formula (II), $R_1$ and $R_2$ are preferably a hydrogen atom, a methyl group, a chlorine atom, or a bromine atom, with a hydrogen atom, a methyl group and a bromine atom being particularly preferred. $R_3$ and $R_5$ are preferably a methyl group, a tert-butyl group, a nonyl group, a phenyl group, a chlorine atom or a bromine atom, with a methyl group, a tert-butyl group, a phenyl group and a bromine atom being particularly preferred. Further, $R_4$ and $R_6$ are preferably a hydrogen atom, and n is preferably 1 to 25, and more preferably 1 to 8.

It is preferred that the epoxy resin (A-1-2) has a number average molecular weight within the range of generally about 400 to 8,000, particularly 500 to 3,000 and more preferably 600 to 2,000, as measured by a vapor pressure-osomotic pressure method. For this number average molecular weight one can calculate a number average repeating unit number (n+2). Also, it is preferred that the epoxy resin (A-1-2) has in average generally 3.5 to 10, particularly 3.5 to 8, and more particularly 4 to 7, glycidyl groups per molecule, and that the epoxy rein (A-1-2) has an epoxy equivalent within the range of about 180 to about 2,000, particularly 180 to 1,000 and more particularly 200 to 600.

The epoxy resin (A-1-2) can be prepared, for example, by reacting epihalohydrin (a-5) with a phenolnovolak type resin (a-4) which is obtained by polycondensation reaction between a bifunctional phenyl compound (a-1) represented by the following general formula (IX)

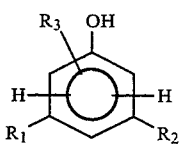 (IX)

wherein $R_1$, $R_2$ and $R_3$ have the same meanings as defined above,
and an aldehyde compound (a-2) represented by the following general formula (X)

$R_4$—CHO wherein $R_4$ has the same meaning as defined above, and/or a ketone compound (a-3) represented by the following general formula (XI)

$R_4$—CO—$R_6$ wherein $R_4$ and $R_6$ have the same meanings as defined above, to introduce a glycidyl ether group in the phenol-novolak type resin (a-4).

During or after the reaction for obtaining the aforementioned phenol-novolak resin (a-4), a monofunctional phenol compound (a-6) represented by the following general formula (XII)

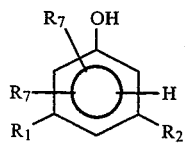 (XII)

wherein
$R_7$ represents an alkyl group having 1 to 10 carbon atoms, an aryl group, an aralkyl group, an allyl group or a halogen atom; and
$R_1$ and $R_2$ have the same meanings as defined above, may be used in combination as a terminal blocking agent, as necessary.

Specific examples of the group represented by $R_7$ in the formula (XII) above include a methyl group, an ethyl group, a propyl group, a n-butyl group, a tert-butyl group, a pentyl group, a hexyl group, a nonyl group, an ethylene group, a propylene group, a phenyl group, a benzyl group, a chlorine atom, a bromine atom, and an iodine atom, with a methyl group, a tert-butyl group, a nonyl group, a phenyl group, a chlorine atom, and a bromine atom being particularly preferred.

The term "bifunctional" as used for the phenol compound as component (a-1) above means that in general formula (IX), two hydrogen atoms are bonded directly to the benzene nucleus at the ortho and/or para-position with respect to the hydroxyl group. The hydrogen atoms will react with carbonyl group (C=O) in the components (a-2) and (a-3) above by condensation reaction with dehydration to form a phenol-novolak resin (a-4).

The term "monofunctional" as used for the phenol compound as component (a-6) means that in the general formula (XII), one hydrogen atom is bonded to the benzene ring at the ortho- or para-position with respect to the hydroxyl group. The hydrogen atom will react with carbonyl group (C=O) in the component (a-2) or (a-3) above by condensation reaction with dehydration to form terminals of the phenol-novolak type resin (a-4).

As the bifunctional compound (a-1) represented by the formula (IX) above, there can be cited, for example, phenol, p-propenylphenol, o-benzylphenol, 6-n-amyl-n-cresol, o-cresol, p-cresol, o-ethylphenol, o-phenylphenol, p-phenylphenol, p-tert-pentylphenol, p-tert-butylphenol, o-chlorophenol, p-chlorophenol, 4-chloro-3,5-xylenol, o-allylphenol, nonylphenol, o-bromophenol, p-cumylphenol, etc.

As the aldehyde compound (a-2) represented by the formula (X) above, there can be cited, for example, acetaldehyde, formaldehyde, etc. Also, m- (or p-) hydroxybenzaldehyde may be used as the aldehyde compound (a-2), and after the reaction with the component (a-1), the hydroxybenzaldehyde may be converted to glycidyl ether with the epihalohydrin (a-5). The benzene nucleus of the hydroxybenzaldehyde may be substituted with an alkyl group having 1 to 10 carbon atoms.

As the ketone compound (a-3) represented by the formula (XI) above, there can be cited, for example, acetone, methyl ethyl ketone, methyl isobutyl ketones, etc. Further, use of 2-acetylphenyl-2-hydroxyphenylpropane makes it possible to introduce a glycidyloxyphenyl group in the resin represented by the formula (II) above.

This makes at least a portion of

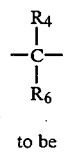

to be

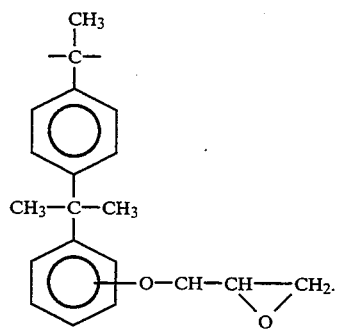

Further, as the epihalohydrin (a-5), there can be cited, for example, epichlorohydrin, epibromohydrin, etc.

The phenol-novolak resin (a-4) can be obtained by polycondensing the (a-1) component above with the (a-2) and/or (a-3) component above. The polycondensation reaction can be performed similarly to an ordinary production method for phenol-novolak resin which is known by itself. More specifically, the reaction may be performed by a batch method, or by the continuous method as described, for example, in Japanese Laid-Open Patent Publication No. 130498/1976. For example, the (a-4) component can be obtained by blending each component in proportions such that the repeating unit number (n) in the formula (II) above is within the range of 1 to 38, and the number average molecular weight and epoxy equivalent are within the aforementioned ranges, followed by reaction. In this reaction, there may be used a catalyst such as inorganic acids, e.g., hydrochloric acid, phosphoric acid, sulfuric acid, etc.; organic acids, e.g., p-toluenesulfonic acid, oxalic acid, etc.; metal salts, e.g., zinc acetate, etc.

In the production of the (a-4) component, the monofunctional phenol compound (a-6) represented by the formula (IX) above may be reacted as a terminal blocking agent during or after polycondensation reaction of the (a-1) component with the (a-2) component and/or (a-3) component as necessary.

Specific examples of the monofunctional phenol compound (a-6) represented by the formula (IX) above include, for example, 2-tert-butyl-4-methylphenol, 2,4-xylenol, 2,6-xylenol, 2,4-dichlorophenol, 2,4-dibromophenol, dichloroxylenol, dibromoxylenol, 2,4,5-trichlorophenol, 6-phenyl-2-chlorophenol, etc.

The polycondensation of the (a-6) component with the (a-1) component, (a-2) component and/or (a-3) component above can be performed in the same manner as described above. Novolak-phenol resin obtained using the (a-6) component in combination is also included in the category of the (a-4) component.

The (A-1-2) component can be obtained by reacting the (a-5) component with phenolic hydroxyl groups in the (a-4) component to convert them into glycidyl ether. More specifically, for example, the (a-4) component is dissolved in the (a-5) component, and an aqueous solution of an alkali metal hydroxide is continuously added to the resulting solution, followed by distilling off water and unreacted (a-5) component in the reaction mixture. From the distillate can be removed (a-5) component, which can be reused. This reaction can be performed preferably in the presence of an ether type solvent such as dioxane, diethoxyethane, etc.

The component (A-1-2) may be one which has been produced as described above or one which is commercially available. As such a commercially available product, there can be cited, for example, DEN-438 and DEN-439 (trade names for products by Dow Chemical Japan Co., Ltd.) as polyglycidyl ether product of phenol-novolak resin; EPICRON N-695 (trade names for a product by DAI-NIPPON INK AND CHEMICALS INCORPORATED.), ESCN-195XHH (trade names for a product by SUMITOMO CHEMICAL CO., LTD.), EOCN-102S, EOCN-1020 and EOCN-104S (trade names for a product by NIPPON KAYAKU CO., LTD.) as polyglycidyl ether products of cresol-novolak resins; BREN-S (trade name for a product by NIPPON KAYAKU CO., LTD.) as polyglycidyl ether product of bromine-modified phenol-novolak resin; ESMB-260 (trade name for a product by SUMITOMO CHEMICAL CO., LTD.) as polyglycidyl ether product of long-chain alkyl-modified phenol-novolak resin; etc.

Component (A-2): Primary or secondary amine compound having at least one primary hydroxyl group per molecule This component reacts with the component (A-1-1) and/or (A-1-2) above and serves to introduce primary hydroxyl group and basic group(s) in the component (A-1-1) and/or (A-1-2).

Reaction between amino groups in the component (A-2) and glycidyl groups represented in the component (A-1-1) and/or (A-1-2) produces cationic resin having primary hydroxyl groups and basic groups. The cationic resin is superior in water dispersibility and throwing power even after partial neutralization or at high pH over the aforementioned conventional cationic resin produced by reaction between the conventional bisphenol A type epoxy resin, and does not deteriorate curability and corrosion resistance of a coating film formed.

As the component (A-2), there can be cited the following compounds.

(1) Monoalkanolamines such as monoethanolamine, monopropanolamine, monobutanolamine, etc.

(2) N-Alkylalkanolamines or N,N-dialkanolamines such as N-methylethanolamine, N-ethylethanolamine, N,N-diethanolamine, N,N-di-n-(or iso-)propanolamine, N,N-dibutanolamine, etc.

(3) Addition product of monoalkanolamine and α,β-unsaturated carbonyl compound: for example, addition product of monoethanolamine and N,N-dimethylaminopropylacrylamide, addition product of monoethanolamine and hydroxyethyl (meth)acrylate, addition product of monoethanolamine and hydroxypropyl (meth)acrylate, addition product of monoethanolamine and hydroxybutyl (meth)acrylate, etc.

(4) Hydroxyalkylaminoalkylamine such as hydroxyethylaminoethylamine.

(5) Condensation product between at least one compound selected from hydroxyethylamine, hydroxyethylhydrazine and hydroxybutylhydrazine and a ketone compound, for example, dimethyl ketone, methyl ethyl ketone, methyl isobutyl ketone, dibutyl ketone, dipropyl ketone, etc.

(6) Amine compound having a primary hydroxyl group, a secondary amino group and an amido group in one molecule simultaneously, represented by the following general formula (XIII)

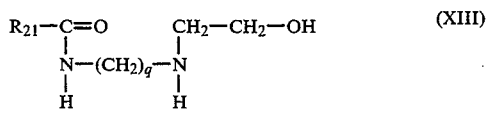

wherein q is an interger of 1 to 6;

$R_{21}$ is hydrocarbon chain having 4 to 36 carbon atoms which may contain a hydroxyl group and/or a polymerizable unsaturated group.

The amine compound represented by the general formula (XIII) can be obtained, for example, by condensation with dehydration between N-hydroxyalkylalkylenediamine, and a monocarboxylic acid having 5 to 37 carbon atoms. As the amine, there can be used preferably diamines having a primary hydroxyl group, such as hydroxyetheylaminoethylamine, N-hydroxyethylpropylenediamine, N-hydroxyethylbutylenediamine, N-hydroxyetheylpentylenediamine, N-hydroxyethylhexylenediamine, etc. As the monocarboxylic acid, there can be cited, for example, mixed fatty acids such as coconut oil fatty acid, castor oil fatty acid, rice bran oil fatty acid, soy bean fatty acid, tall oil fatty acid, dehydrated castor oil fatty acid, safflower oil fatty acid, linseed oil fatty acid, and tung oil fatty acid; caprylic acid, captic acid, lauric acid, myristic acid, palmitic acid, stearic acid, oleic acid, ricinolic acid, rinolic acid, rinoleic acid, eleostearic acid, 12-hydroxystearic acid, behenic acid, etc.

The reaction between the aforementioned amine and monocarboxylic acid for obtaining the amine compound represented by the formula (XIII) above can be performed usually by mixing the both components in equimolar proportions, removing a predetermined amount of reaction product water using an organic solvent such as toluene or methyl isobutyl ketone, and then removing the remaining organic solvent by a vacuum evaporation method or the like to obtain an amine compound. It is preferred that the amine compound thus obtained has an amine (secondary amine) value within the range of generally 88 to 350, particularly 120 to 230, and more particularly 130 to 200, and a hydroxyl value, preferably primary hydroxyl value (KOH mg/g) within the range of generally 44 to 350, particularly 60 to 230, and more particularly 65 to 200.

Among (1) to (6) as the component (A-2), the amine compounds (2), (3) and (6) above are preferred. In particular, it is preferred to use the amine compound represented by the formula (XIII) (especially hydroxyethylaminoethyl fatty acid amide) and diethanolamine in combination in order to improve properties of the coated surface such as smoothness and corrosion resistance. Preferably, the proportion of the amine compound (especially hydroxyethylaminoethyl fatty acid amide) to diethanolamine 30 to 80% by weight, particularly 40 to 80% by weight, of the former and 70 to 20% by weight, particularly to 60 to 20% by weight, of the latter based on total weight of the both components.

Component (A-3): Phenol compound having at least one phenolic hydroxyl group per molecule Phenol compound having a phenolic hydroxyl group as the component (A-1) is desirably one which has among others at least one, preferably 1 to 4, and more preferably 1 to 2 structural units represented by the following general formula (XIV)

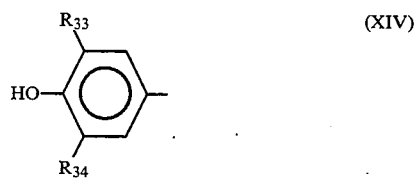

wherein
$R_{33}$ and $R_{34}$, which are the same or different, independently represent a hydrogen atom, an alkyl group having 1 to 10 carbon atoms, an aryl group, an aralkyl group, an allyl group or a halogen atom; and the component (A-3) has a number average molecular weight within the range of usually 94 to 20,000, particularly 150 to 5,000, and more particularly 200 to 3,000.

Specific examples of the component (A-3) include polyphenol compounds such as bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, 1,1,2,2,-tetrakis(4-hydroxyphenyl)ethane, 4,4'-dihydroxydiphenyl ether, 4,4'-dihydroxydiphenylsulfone, phenol-novolak, and cresol-novolak; monophenol compounds such as phenol, nonylphenol, $\alpha$- or $\beta$-naphthol, p-tert-octylphenol, and o- or p-phenylphenol.

In this invention, the corrosion resistance of a coating film can be further increased by the use of compounds component (A-3) containing a functional group having a phenolic hydroxyl group, represented by the following general formula (XV)

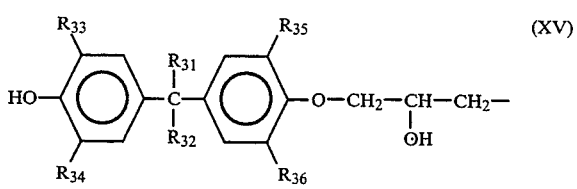

wherein
$R_{31}$ and $R_{32}$, which are the same or different, independently represent an alkyl group having 1 to 4 carbon atoms, and
$R_{33}$ and $R_{36}$, which are the same or different, independently represent a hydrogen atom, an alkyl group having 1 to 10 carbon atoms, an aryl group, an aralkyl group, an allyl group or a halogen atom.

There is no limitation on the number average molecular weight of the component (A-3) containing the functional group having a phenolic hydroxyl group represented by the formula (XV) above, and is preferably within the range of generally 200 to 20,000, particularly 500 to 5,000, and more particularly 800 to 3,000. It is preferred that the component (A-3) contains in average 0.3 to 2, particularly 0.5 to 1.5, and more particularly 0.8 to 1.2 functional groups having a phenolic hydroxyl group represented by the formula (XV) above per molecule.

In addition, there can be favorably used, as the compound (component (A-3)) containing the functional group having a phenolic hydroxyl group represented by the formula (XV) above, a compound represented by the following general formula (XVI)

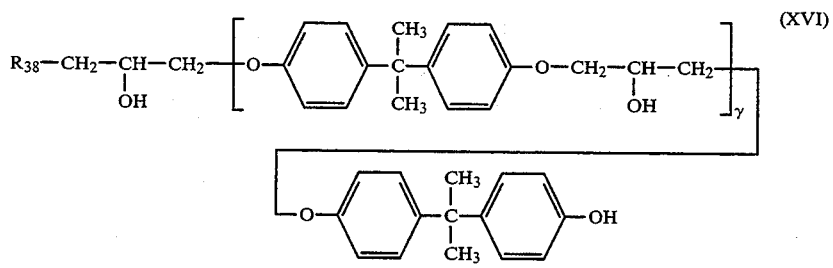

wherein
$\gamma$ is 0 or integer of 1 to 7; and
$R_{38}$ represents a residual group of an active hydrogen-containing compound.

As the active hydrogen-containing compound which is a precursor of $R_{38}$ in the formula (XVI) above, there can be cited, for example, amines such as secondary amines; phenols such as phenylphenol and nonylphenol; organic acids such as fatty acids; thiols; alcohols such as alkyl alcohols, cellosolve, butylcellosolve, and carbitol; inorganic acids; and so on. Among them, particularly preferred are secondary amines having a primary hydroxyl group such as dialkanolamines; amine compounds represented by the formula (XIII) above; phenols such as nonylphenol, phenylphenol, phenol, and hydroquinone monomethyl ether; fatty acids such as stearic acids, oleic acid, and soy bean fatty acid; lower organic acids such as acetic acid, formic acid, and hydroxyacetic acid; and so on.

A compound the same as that represented by the formula (XVI) except that the both ends thereof are only one of $R_{38}$ and —OH instead of $R_{38}$ and —OH may be present in the component (A-3) as a mixture. It is preferred that the compound contains the functional group having a phenolic hydroxyl group in an amount of in average 0.5 to 1.5, particularly 0.8 to 1.2 per one molecule, and a number average molecular weight within the range of 500 to 20,000, particularly 800 to 3,000.

The component (A-3) containing the functional group having a phenolic hydroxyl group can be obtained, for example, by reacting a bisphenol type glycidyl ether, a bisphenol type diphenol and an active hydrogen-containing compound (for example, N-alkylalkanolamine, dialkanolamine, etc.) in the presence of a catalyst and a solvent as necessary at a temperature of 30° to 300° C., preferably 70° to 180° C. In this reaction, there may be present as a mixture, polyols such as dimer diol, ethylene glycol, propylene glycol, and butylene glycol; polyether polyols such as polyethylene glycol, polypropylene glycol, and polybutylene glycol; polyester polyols such polycaprolactone; polycarboxylic acids; polyisocyanates; monoisocyanates; oxides of unsaturated compounds such as ethylene oxide, propylene oxide, butylene oxide, and styrene oxide; glycidyl ethers hydroxyl group-containing compounds such as ally glycidyl ether, polypropylene glycol diglycidyl ether, 2-ethylhexyl glycidyl ether, methyl glycidyl ether, butyl glycidyl ether, and phenyl glycidyl ether; glycidyl esters or organic acids such as fatty acids; alicyclic oxirane-containing compounds; and so on. Further, d-4-caprolactone, acrylic monomer, etc. may be graft polymerized thereon.

Preparation of component (A):

A component (A) used in this invention can be obtained by reacting a component (A-1-1) and/or a component (A-1-2) described above (hereafter these two components are generally referred to as components (A-1)), a component (A-2), and a component (A-3). This reaction can be carried out by reacting the component (A-2) and the component (A-3) with the component (A-1) simultaneously or successively. For example, this reaction can be carried out according to a process, for example, which comprises either mixing and reacting these components simultaneously, or reacting the component (A-2) with the component (A-1) and then reacting the component (A-3), or reacting the component (A-3) with the component (A-1) and then reacting the component (A-2), and thereby the component (A) is obtained.

The reaction between the components (A-1) and (A-2) is a reaction between the glycidyl group in the component (A-1) and the primary and/or secondary amino group in the component (A-2), which reaction produces a secondary and/or tertiary amino group, respectively. Also, the reaction between the components (A-1) and (A-3) is a reaction between the glycidyl group in the component (A-1) and the phenolic hydroxyl group in the component (A-3), which reaction produces an ether bond. The component (A) thus obtained contains no or substantially no remaining glycidyl group (it contains substantially no glycidyl group) since as a rule the glycidyl group contained in the component (A-1) is consumed in the aforementioned reaction.

Proportions of the components are not critical and may be selected freely depending on the purposes. For example, it is preferred that the reaction proceeds such that total mole number of the amino group in the component (A-2) and the phenolic hydroxyl group in the component (A-3) is 0.75 to 1.5 moles, particularly 0.8 to 1.2 moles for 1 mole of glycidyl groups in component (A-1). If the total mole number is less than 0.75 mole, the viscosity of the product could sometimes become high while use of the total mole number above 1.5 moles could result in increased amount of remaining unreacted amino group which gives adverse influence on electrodeposition characteristics.

Further, the amount of the component (A-1) to be used is suitably 0.5 to 75% by weight, particularly 5 to 50% by weight, and more particularly 7 to 20% by weight, based on total weight of the components (A-1), (A-2) and (A-3). If it is less than 0.5% by weight, the resulting resin tends to have insufficient water dispersibility, and on the contrary, if it exceeds 75% by weight, the amine value increases to high enough a level to deteriorate corrosion resistance of the resulting coated film.

It is desirable to use the component (A-2) in amounts such that the hydroxyl equivalent of the resulting component (A) is within the range of 250 to 2,000, preferably 300 to 1,000, and more preferably 300 to 700. If the hydroxyl equivalent is below 250, the amine value tends to increase to deteriorate the corrosion resistance of the resulting coated film while if it exceeds 2,000, the curability of the resin decreases, which causes a fear that the corrosion resistance of the resulting coated film decreases. On the other hand, it is suitable that the component (A-3) is used in an amount within the range of 0.05 to 1.5 moles, particularly 0.2 to 1.2 moles, and more particularly 0.3 to 1.0 mole, per mole of the component (A-1). If the amount of the component (A-3) is less than 0.05 moles, the water dispersibility of the resin tend to decrease, while if it exceeds 1.5 moles smoothness of the coated surface tends to decrease.

Further, it is preferred that the reaction between the component (A-1), (A-2) and (A-3) proceeds at a temperature within the range of usually 50° to 300° C. particularly 70° to 200° C. This reaction can be performed in the presence of an organic solvent such as an alcohol, a ketone or an ether.

It is preferred that the component (A) obtained has a number average molecular weight within the range of generally 1,000 to 20,000, particularly 1,500 to 10,000, and more particularly 1,500 to 4,000. Also, it is preferred that the cationic resin, as described above, has a hydroxyl equivalent within the range of generally 250 to 2,000, particularly 300 to 1,000, and more particularly 300 to 700.

Upon the production of the component (A), other cationizing agents (A-4) described below may be used together with the component (A-2) in order to adjust the hydroxyl equivalent. The component (A-4) may be used at an initial stage or midway of the aforementioned reaction, or after the reaction.

As the other cationizing agent (A-4), there can be cited, for example, primary amines represented by monoalkylamines such as methylamine, ethylamine, and n-or iso-propylamine; secondary amines represented by dialkylamines such as diethylamine, dipropylamine, and dibutylamine; polyamines represented by alkylene polyamines such as ethylenediamine, diethylenetriamine, ethylaminoethylamine, methylaminopropylamine, dimethylaminoethylamine, and dimethylaminopropylamine; and so on.

Further, these may be used together with ammonia, hydrazine, N-hydroxyethylimidazoline compound, etc.

It is desirable to react such a cationizing agent so that primary or secondary amino groups do not remain in the component (A) after reaction.

As the other cationizing agent (A-4), there can also be used amine compounds which have a secondary hydroxyl group, a secondary amino group and an amido group simultaneously in one molecule, obtained by replacing the primary hydroxyl group-containing primary and/or secondary diamine by a secondary hydroxyl group-containing primary and/or secondary diamine in the preparation of the amine compound (6) as described on the component (A-2) above.

Further, tertiary amines such as triethylamine, triethanolamine, N,N-dimethylethanolamine, N-methyldiethanolamine, N,N'-diethylethanolamine, and N-ethyldiethanolamine may be used as the component (A-4). These may also be used in the form of quaternary salts obtained by protonating with an acid followed by reaction with an epoxy group.

In addition to the amino compounds, there can be used tertiary sulfonium salts obtained by reacting salts of sulfides such as diethyl sulfide, diphenyl sulfide, tetramethylene sulfide and thiodiethanol with boric acid, carbonic acid, organic monocarboxylic acid or the like with an epoxy group.

Further, there can be used, as the cationizing agent, quaternary phosphonium salts obtained by reacting salts of phosphines such as triethylphosphine, phenyldimethylphosphine, diphenylmethylphosphine, and triphenylphosphine with the above acid with an epoxy group.

In this invention, while it is necessary to form the component (A) using the component (A-2), use of the aforementioned other cationizing agent (A-4) is not mandatory.

The component (A) containing a primary hydroxyl group thus obtained is used as a resin for a cationic electrodeposition coating composition. In particular, the resin (A) is excellent in water dispersibility and hence it can be blended with an organic or inorganic substance having insufficient water dispersibility to improve its water dispersibility. Therefore, the resin (A) is also useful as a water dispersibility improving agent for a cationic electrodeposition coating composition.

Component (B):

A resin (B-1) having per molecule at least two phenolic hydroxyl groups, or resin (B-2) having per molecule at least one each of a phenolic hydroxyl group and a primary hydroxyl group originating in the alkanolamine (at least two in total). It is preferable that these intrinsically have neither primary nor secondary amino group.

It is possible, by using them, to enhance the curability, corrosion resistance, water resistance, etc. of the formed coating film. The number average molecular weight of the component (B) is not particularly limited, but it is preferable that it is in the range of generally about 200 to about 20,000, particularly about 200 to about 15,000, and further particularly about 200 to about 10,000.

Component (B-1):

A resin having per molecule at least two phenolic hydroxyl groups.

The component (B-1) can have per molecule at least two, preferably 2 to 38, and more preferably 2 to 15 phenolic hydroxyl groups. As such resins (B-1), those exemplified below can be used preferably.

As resins (B-1-1) having per molecule two phenolic hydroxyl groups, there can, for example, be mentioned bis(4-hydroxyphenyl)-2,2-propane (bisphenol A), bis(4-hydroxyphenyl)-2,2-methane (bisphenol F), 4,4'-dihydroxybiphenyl, 4,4'-(1-α-methylbenzylidyne)bisphenol, 2,2'-bis(4-hydroxy-3-methylphenyl)propane, methylenebis-p-cresol, 4,4'-ethylidenebisphenol, bis(4-hydroxy-3,5-dimethylphenyl)methane, 2,2-bis(4-hydroxy-3,5-dimethylphenyl)propane, dihydroxybenzophenone, 1,1-bis(4-hydroxyphenyl)cyclohexane, etc.

As resins (B-1-2) having per molecule three phenolic hydroxyl groups, there can, for example, be mentioned 4,4'4''-methylidenetrisphenol, 4,4'-[(4-hydroxyphenyl)-methylene]bis[2-methoxyphenol], 4,4'-[(4-hydroxyphenyl)methylene]bis[2,6-dimethylphenol], 4,4'4''-ethylidenetrisphenol, 4,4-[1-[4-(2-(4-hydroxyphenyl)-2-propyl)phenyl]ethylidene]bisphenol, etc.

As resins (B-1-3) having per molecule more than three phenolic hydroxyl groups, there can, for example, be mentioned phenol type novolak resins represented by the following formula (XVII),

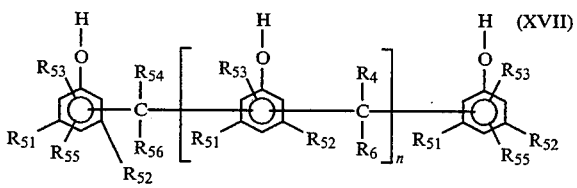

wherein $R_{51}$ and $R_{52}$, which are the same or different, independently represent a hydrogen atom, an alkyl group having 1 to 8 carbon atoms, an aryl group, an aralkyl group or a halogen atom;

$R_{53}$ represents a hydrogen atom, an alkyl group having 1 to 10 carbon atoms, an aryl group, an aralkyl group, an allyl group or a halogen atom;

$R_{54}$ and $R_{56}$, which are the same or different, independently represent a hydrogen atom or an alkyl group having 1 to 4 carbon atoms;

$R_{55}$ represents a hydrogen atom, an alkyl group having 1 to 10 carbon atoms, an aryl group, an aralkyl group, an allyl group or a halogen atom; and s is an integer of 1 to 38.

In the above general formula (XVII), "alkyl group" is straight-chain or branched chain one, and there can, for example, be mentioned methyl, ethyl, propyl, isopropyl, butyl, isobutyl, sec-butyl, tert-butyl, pentyl, isoamyl, hexyl, heptyl, octyl, 2-ethylhexyl, nonyl and decyl groups, etc. Further, the "aryl group" may either be monocyclic or polycyclic, and there can, for example, be mentioned phenyl and naphthyl groups, etc. and a phenyl group is particularly preferred. Further, "aralkyl group" is an aryl-substituted alkyl group, and, for example, benzyl and phenethyl groups, etc. are included, and a benzyl group is preferred among them.

The "halogen atoms" includes fluorine, chlorine, bromine and iodine atoms.

In the above formula (XVII), as $R_{51}$ and $R_{52}$, a hydrogen atom, a methyl group, a chlorine atom, and a bromine atom are preferred, and a hydrogen atom, a methyl group and a bromine atom are particularly preferred. Further, as $R_{53}$ and $R_{55}$, a methyl group, a tert-butyl group, a nonyl group, a phenyl group, a chlorine atom and a bromine atom are preferred, and a methyl group, a tert-butyl group, a phenyl group and a bromine atom are particularly preferred. Further, $R_{54}$ and $R_{56}$ are preferably hydrogen atoms, and s is particularly preferably 1 to 8.

It is preferable that the number average molecular weight of the component (B-1-3) is in the range of generally about 400 to about 20,000, particularly about 500 to about 15,000, further particularly preferably 600 to 10,000 based on measurement according to the vapor pressure-osomotic pressure method. A number average repeating unit number (s+2) can be calculated from this number average molecular weight. Further, the component (B-1-3) preferably has per molecule 3 to 15 phenolic hydroxyl groups, and it is preferred that the phenolic hydroxyl group equivalent of the component (B-3) is in the range of generally about 120 to about 2,000, particularly 140 to 600.

A (B-1-3) component can, for example, be obtained by condensation polymerizing a bifunctional phenyl compound represented by the following formula (XVIII)

wherein $R_{51}$, $R_{52}$ and $R_{53}$ have the same meanings as defined above,
with an aldehyde compound represented by the following formula (XIX)

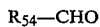

$R_{54}$—CHO wherein $R_{54}$ has the same meaning as defined above, and/or a ketone compound represented by the following (XX)

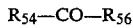

$R_{54}$—CO—$R_{56}$ wherein $R_{54}$ and $R_{56}$ have the same meanings as defined above.

It is possible to use together therewith, during or after the reaction for obtention of the phenolic type novolak resin of the above formula (XVII), if necessary, as a terminal blocking agent, a monofunctional phenol compound represented by the following formula (XXI)

wherein
$R_{57}$ represents an alkyl group having 1 to 10 carbon atoms, an aryl group, an aralkyl group, an allyl group or a halogen atom; and
$R_{51}$ and $R_{52}$ have the same meanings as defined above.

Specific examples of the group represented by $R_{57}$ in the formula (XXI) above include a methyl group, an ethyl group, a propyl group, a n-butyl group, a tert-butyl group, a pentyl group, a hexyl group, a nonyl group, an ethylene group, a propylene group, a phenyl group, a benzyl group, a chlorine atom, a bromine atom, and an iodine atom, with a methyl group, a tert-butyl group, a nonyl group, a phenyl group, a chlorine atom, and a bromine atom being particularly preferred.

The term "bifunctional" as used for the phenol compound means that in general formula (XVIII), two hydrogen atoms are bonded directly to the benzene nucleus at the ortho and/or para-position with respect to the hydroxyl group. The hydrogen atoms will react with carbonyl group (C=O) in the aldehyde compound and the ketone compound above by condensation reaction with dehydration to form a phenol-novolak resin.

The term "monofunctional" as used for the phenol compound means that in the general formula (XXI), one hydrogen atom is bonded to the benzene ring at the ortho- or para-position with respect to the hydroxyl group. The hydrogen atom will react with carbonyl group (C=O) in the aldehyde compound or the ketone compound by condensation reaction with dehydration to form terminals thereof.

As the bifunctional phenol compound represented by the formula (XVIII) above, there can be cited, for example, phenol, p-propenylphenol, o-benzylphenol, 6-n-amyl-n-cresol, o-cresol, p-cresol, o-ethylphenol, o-phenylphenol, p-phenylphenol, p-tert-pentylphenol, p-tert-butylphenol, o-chlorophenol, p-chlorophenol, 4-chloro-3,5-xylenol, o-allylphenol, nonylphenol, o-bromophenol, p-cumylphenol, etc.

As the aldehyde compound represented by the formula (XIX) above, there can be cited, for example, acetaldehyde, formaldehyde, etc. Also, m- (or p-) hydroxybenzaldehyde may be used as the aldehyde compound, and after the reaction with the bifunctional phenyl compound, the hydroxybenzaldehyde may be converted to glycidyl ether with an epihalohydrin. The benzene nucleus of the hydroxybenzaldehyde may be substituted with an alkyl group having 1 to 10 carbon atoms.

As the ketone compound represented by the formula (XX), there can be cited, for example, acetone, methyl ethyl ketone, methyl isobutyl ketones, etc. Further, use of 2-acetylphenyl-2-hydroxyphenylpropane makes it possible to introduce a glycidyloxyphenyl group in the resin represented by the formula (XVII) above.

This makes at least a portion of

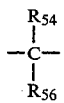

to be

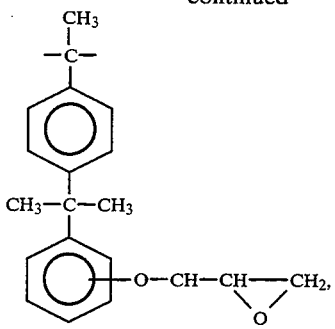

Further, as the epihalohydrin, there can be cited, for example, epichlorohydrin, epibromohydrin, etc.

The phenol-novolak resin (B-1-3) can be obtained by polycondensing the bifunctional phenyl compound above with the aldehyde compound and/or ketone compound above. The polycondensation reaction can be performed similarly to an ordinary production method for phenol-novolak resin which is known by itself. More specifically, the reaction may be performed by a batch method, or by the continuous method as described, for example, in Japanese Laid-Open Patent Publication No. 130498/1976. For example, the component (B-3) can be obtained by blending each component in proportions such that the repeating unit number (s) in the formula (XVII) above is within the range of 1 to 38, and the number average molecular weight and epoxy equivalent are within the aforementioned ranges, followed by reaction. In this reaction, there may be used a catalyst such as inorganic acids, e.g., hydrochloric acid, phosphoric acid, sulfuric acid, etc.; organic acids, e.g., p-toluenesulfonic acid, oxalic acid, etc.; metal salts, e.g., zinc acetate, etc.

In the production of the component (B-1-3), the monofunctional phenol compound represented by the formula (XXI) above may be reacted as a terminal blocking agent during or after polycondensation reaction of the bifunctional phenyl compound with the aldehyde compound and/or the ketone compound as necessary.

Specific examples of the monofunctional phenol compound represented by the formula (XXI) above include, for example, 2-tert-butyl-4-methylphenol, 2,4-xylenol, 2,6-xylenol, 2,4-dichlorophenol, 2,4-dibromophenol, dichloroxylenol, dibromoxylenol, 2,4,5-trichlorophenol, 6-phenyl-2-chlorophenol, etc.

The polycondensation of the monofunctional phenyl compound with the bifunctional phenyl compound, the aldehyde compound and/or the ketone compound above can be performed in the same manner as described above. Novolak-phenol resin obtained using the monofunctional phenol compound in combination is also included in the category of the component (B-1-3).

Further, the component (B-1) also includes a product (B-1-4) obtained by reacting a mono- or polyglycidyl compound with at least one component selected from the above components (B-1-1) to (B-1-3), if necessary in the presence of a catalyst and a solvent, at a temperature of 30° to 300° C., preferably 70° to 180° C.

As mono- or polyglycidyl compounds, there can, for example, be mentioned bisphenol type diglycidyl ethers; oxides of unsaturated compounds such as ethylene oxide, propylene oxide, butylene oxide and styrene oxide; glycidyl ethers of compounds having a hydroxyl group such as allyl glycidyl ether, polypropylene glycol diglycidyl ether, 2-ethylhexyl glycidyl ether, methyl glycidyl ether, butyl glycidyl ether and phenyl glycidyl ether; glycidyl esters of organic acids such as fatty acids; etc.

Further, it is also possible to further coexist the following components in the formation reaction of the components (B-1-4) so long as the reaction products have per molecule two or more phenolic hydroxyl groups. For example, there can coexist polyols such as dimerdiols, ethylene glycol, propylene glycol and butylene glycol; polyether polyols such as polyethylene glycol, polypropylene glycol and polybutylene glycol; polyester polyols such as polycaprolactones; polycarboxylic acids; polyisocyanates; monoisocyanates; alicyclic oxirane-containing compounds; etc. Further, it is also possible to graft polymerize δ-4-caprolactone, an acrylic monomer or the like.

Component (B-2):

A resin having per molecule two or more in total of phenolic hydroxyl groups wherein a hydroxyl group directly binds to the benzene ring and primary hydroxyl groups introduced by an alkanolamine, and intrinsically having neither primary nor secondary amino group.

A component (B-2) can be obtained by reacting a resin (B-1) described above and having per molecule two or more phenolic hydroxyl groups, a polyglycidyl compound and an alkanolamine, if necessary in the presence of a catalyst and a solvent, at a temperature of 30° to 300° C., preferably 70° to 180° C.

As resins (B-1) having per molecule two or more phenolic hydroxyl groups and polyglycidyl compounds, the same ones as described above can be used. Further, it is preferred to use as alkanolamines at least one compound selected from compounds mentioned in (1) to (6) exemplified in the description of the component (A-2).

Further, it is also possible to further coexist a component described below in the formation reaction of the component (B-2) so long as the reaction product has per molecule two or more in total of phenolic hydroxyl groups and hydroxyl groups originating in the alkanolamine. For example, it is possible to coexist a polyol such as a dimerdiol, ethylene glycol, propylene glycol or butylene glycol; a polyether polyol such as polyethylene glycol, polypropylene glycol or polybutylene glycol; a polyester polyol such as polycaprolactone; a polycarboxylic acid; a polyisocyanate; a monoisocyanate; an alicyclic oxirane-containing compound; or the like. Further, it is also possible to graft polymerize a δ-4-caprol actone, acrylic monomer or the like.

Component (C):

At least one resin or compound selected from the following components (C-1), (C-2) and (C-3) is used.

Component (C-1):

A novolak phenol type glycidyl ether group-containing resin represented by the following formula (III)

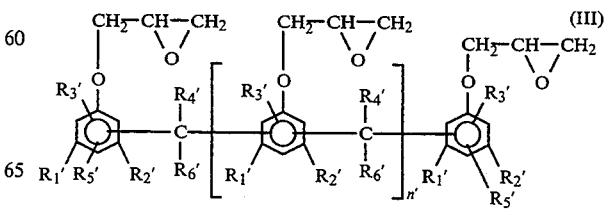

wherein

R'₁ and R'₂, which are the same or different, independently represent a hydrogen atom, an alkyl group having 1 to 8 carbon atoms, an aryl group, an aralkyl group or a halogen atom, R'₃ represents a hydrogen atom, an alkyl group having 1 to 10 carbon atoms, an aryl group, an aralkyl group, an allyl group or a halogen atom, R'₄ and R'₆, which are the same or different, independently represent a hydrogen atom or an alkyl group having 1 to 4 carbon atoms, R'₅ represents an alkyl group having 1 to 10 carbon atoms, an aryl group, an aralkyl group, an allyl group or a halogen atom, and n' is an integer of 1 to 38.

The component (C-1) is structurally analogous the component (A-1-2) used in preparation of the above component (A) and represented by the formula (II), and a different point is that $R_3$ in the formula (II) can be not only an alkyl group having 1 to 10 carbon atoms, an aryl group, an aralkyl group, an allyl group or a halogen atom, but also a hydrogen atom, whereas R'₃ in the formula (III) is an alkyl group having 1 to 10 carbon atoms, an aryl group, an aralkyl group, an allyl group or a halogen atom, and cannot be a hydrogen atom, and both are common in all the other points. Therefore, since the above description on the component (A-1-2) is applied, as it is, to the component (C-1), description on the component (C-1) is omitted herein.

Component (C-2):

An epoxy resin having per molecule at least three epoxy group-containing functional groups represented by the following formula (IV)

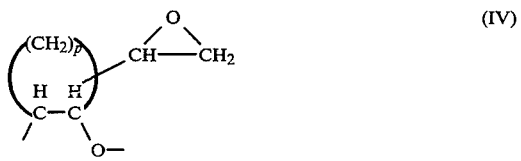

wherein p is an integer of 2 to 4.

It is possible to use, as the component (C-2), the same epoxy resin as described as the component (A-1) used for preparation of the component (A). Therefore, since the above description on the component (A-1-1) is applied, as it is, to the component (C-2), description on the component (C-2) is omitted herein.

Component (C-3):

A compound having per molecule two or more glycidyl groups originating in glycidylamino groups binding directly to the carbon atoms of the aromatic rings and represented by the following formula (V)

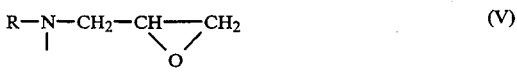

wherein R is a hydrogen atom or a glycidyl group.

The component (C-3) has per molecule aromatic rings and glycidyl groups, and the glycidyl groups are introduced in a form of glycidylamino groups represented by the above formula (V), and the nitrogen atom (N) in the formula (V) binds directly to a carbon atom of the aromatic ring.

A component (C-3) can, generally, be obtained by subjecting the amino group (—NH₂) of an aniline derivative and an epihalohydrin (preferably epichlorohydrin) to dehydrohalogenation (condensation) reaction in the presence of a catalyst such as an aqueous alkali metal hydroxide solution. This reaction can be carried out by a process known per se.

When one mole of an epihalohydrin is reacted per mole of the amino group in this reaction, one glycidyl group is introduced, theoretically, into the amino group and one hydrogen atom remains in a binding state in the amino group and this hydrogen atom corresponds to the hydrogen atom as R in the formula (V). When 2 moles of the epihalohydrin is reacted in this reaction, two glycidyl groups are introduced into the amino group and one glycidyl group among them corresponds to R in the formula (V).

In the above, the "aniline derivatives" have a broad sense and include compounds having one or two or more amino groups (—NH₂) directly binding to ring carbon atoms of an aromatic ring such as a benzene ring or naphthalene ring, and, for example, there can be mentioned monoaniline derivatives wherein one amino group (—NH₂) directly binds to a ring carbon atom of a benzene ring or a naphthalene ring, such as aniline, o-toluidine, m-toluidine, p-toluidine, o-ethylaniline, m-ethylaniline, p-ethylaniline, p-cresidine, 2,4-xylidine, 3,4-xylidine, o-anisidine, p-anisidine and naphthylamine; dianiline derivatives wherein two amino groups (—NH₂) directly bind to ring carbon atoms of a benzene ring or a naphthalene ring, such as phenylenediamine, 2,4-toluylenediamine, diaminobenzanilide, dianisidine, diaminodiphenyl ether, 3,5-diaminochlorobenzene, 3,3'-dimethylbenzidine and 1,5-naphylendiamine; etc., and particularly preferred are phenylenediamine and toluylenediamine.

There can also be used as the aniline derivative a polycondensate wherein plural aromatic rings are bound through methylene groups or the like and which is obtained by reacting an aldehyde (e.g., formamide, acetaldehyde or the like) or a ketone (e.g., acetone, methyl ethyl ketone, methyl isobutyl ketone or the like) with a monoaniline derivative or dianiline derivative described above in the presence of a catalyst, for example, an inorganic acid such as hydrochloric acid, phosphoric acid or sulfuric acid; an organic acid such as paratoluenesulfonic acid or oxalic acid; a metal salt such as zinc acetate; or the like. It is preferably that this polycondensate has a repeating unit of the aromatic ring in the range of 2 to 40, particularly 2 to 20. As specific examples of such polycondensate, there can be mentioned diaminodiphenylmethane, 3,3-dimethyl-4,4-diaminodiphenylmethane, 3,3-diethyl-4,4-diaminodiphenylmethane, etc., but such polycondensates are not limited thereto.

Part of the glycidyl groups of the component (C-3) obtained as above can be modified by reacting therewith one or more selected from a phenol such as bisphenol A, bisphenol F, phenylphenol, nonylphenol or phenol; a higher fatty acid such as a dimer acid, stearic acid, oleic acid or a soybean oil fatty acid; an organic acid such as acetic acid, formic acid or hydroxyacetic acid; an alcohol such as an alkyl alcohol, a cellosolve or a carbitol; and so on. Particularly preferable among them are phenols and high fatty acids. It is preferable to use in this modification a catalyst such as zinc borofluoride or tetramethylammonium chloride.

It is preferable that the component (C-3) used in this invention has a number average molecular weight, measured by the vapor pressure-osmotic pressure method, in the range of about 200 to 8,000, particularly 500 to 5,000, further particularly 500 to 2,000, and an epoxy equivalent in the range of 100 to 2,000, particularly 100 to 1,000, further particularly 100 to 600. It is possible to use commercial products as such components (C-3), and there can, for example, be mentioned GAN (N,N-diglycidylaniline produced by NIPPON KAYAKU CO., LTD.), GOT (N,N-diglycidyl-o-toluidine produced by NIPPON KAYAKU CO., LTD.), MY 720 (N,N,N',N'-tetraglycidyl-4,4'-diaminodiphenylmethane produced by Japan Ciba-Geigy Co.), MY 722 (N,N,N',N'-tetraglycidyl-3,3'-dimethyl-4,4'-diaminodiphenylmethane produced by Japan Ciba-Geigy Co.), etc.

Resin composition for aqueous paint:

The composition for aqueous paint of this invention contains as main components the above-described components (A), (B) and (C), and can, for example, be prepared by neutralizing the basic groups of the component (A) with an acid, and dispersing this together with the components (B) and (C) in an aqueous medium. The neutralization of the component (A) can be made at any point of time before, during or after mixing of the above components. When the component (B) has basic groups, it is also possible to neutralize them in the same manner as in the component (A). There is no particular limitation about the mixing order of the above components, and the mixing can be made by any order, and, for example, processes can be adopted which comprises mixing and dispersing all the components all at once; mixing the components (A) and (B) and then mixing the component (C); mixing the components (A) and (C) and then mixing the component (B); mixing the components (B) and (C) and then mixing the component (A); and the like. Further, as neutralizing agents usable for the neutralization of the component (A), formic acid, acetic acid, lactic acid, butyric acid, etc. are, for example, preferable.

The compounding ratio of the above components (A), (B) and (C) are not particularly limited and can be varied over a wide range depending on uses of the resin composition, etc., but, in general, it is preferable that the compounding ratio is in the range of 10 to 60 wt. % particularly 15 to 50 wt. %, further particularly 25 to 45 wt. % of the component (A), and in the range of 90 to 40 wt. %, particularly 85 to 50 wt. %, further particularly 75 to 55 wt. % in total of the component (B) and the component (C), based on the total solid weight of the three components. Further, it is preferable that the amount of the glycidyl groups (epoxy groups) of the component (C) is in the range of 0.3 to 3 moles, particularly 0.6 to 2 moles, further particularly 0.8 to 1.5 moles per mole of total of the hydroxyl groups contained in the components (A) and (B).

The resin composition for aqueous paint of this invention can, if necessary, contain, besides the components (A), (B) and (C), an extender pigment, an anticorrosive pigment, a dispersing agent, a cissing inhibitor, a curing accelerator, etc. It is preferable that the pigments among them are compounded as a pigment dispersion paste (Y) described below.

Pigment dispersion paste (Y):

A pigment dispersion paste (Y) can be prepared by mixing pigments (color pigment, extender pigment, anticorrosive pigment, etc.) with at least one resin selected from the components (A) and dispersing the former into the latter, and, if necessary, a plasticizer, a wetting agent, a surfactant or antifoaming agent, etc. can further be compounded.

The mixing and dispersion of these components can be carried out using a ball mill, a sand mill, a Crowles dissolver, a continuous dispersing machine or the like, and, for example, it is preferable to disperse the pigments to a desired size and make them wet with the above components (A). The particle size of the pigment after the dispersion is preferably 10 microns or smaller (about 6 to 8 in terms of the degree of Helmann fineness-of-grind gauge). This dispersion is preferably carried out in water. In this occasion, it is preferable to neutralize part or all of the basic groups in the component (A) with an acidic compound as above-mentioned and protonate them, and make a water dispersion. The addition amount of the acidic compound is, preferable, adjusted so that the neutralization value of these resins gets to be in the range of usually 5 to 200, particularly 10 to 150 in terms of KOH (mg/g). The water content in the aqueous divisional liquid of the pigment dispersion paste (Y) is not particularly limited, but it is preferable that the water content is in the range of usually about 20 to 80 wt. %, particularly 40 to 60 wt. %.

There is no particular limitation about the kind of the above pigments in pigment dispersion pastes (Y), and there can, for example, be mentioned color pigments such as carbon black, titanium white, lead oxide and red iron oxide; extender pigments such as antimony oxide, zinc oxide, basic lead carbonate, basic lead sulfate, barium carbonate, calcium carbonate, aluminum silica, magnesium carbonate, magnesium silica, clay and talc; anticorrosive pigments such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide and lead sulfate. It is preferable that the mixing ratio of these pigments with the component (A) is in the range of usually 2/1 to 7/1, particularly 3/1 to 5/1 in terms of the weight ratio of the solid matters.

The resin composition for aqueous paint of this invention can be made into a cationic electrodeposition coating composition by a process known per se, for example by neutralizing the resin composition with an acid component in the same manner as above, and diluting the neutralized composition with water to adjust it to a desired concentration.

A cationic electrodeposition coating composition prepared using the resin composition for water paint of this invention can be applied through cationic electrodeposition onto a suitable electrically conductive substrate (matter to be coated) according to a usual method, and the coating film can be cured with heating at a temperature of for example 80° to 250° C., preferably 120° to 160° C.

Particularly, when it is desired to cure sufficiently electrodeposition coating film, from a cationic electrodeposition coating composition using a resin composition for aqueous paint of this invention, at a low temperature of 160° C. or lower, it is effective to add one or two or more catalysts selected from lead compounds, zirconium compounds, cabalt compounds, aluminum compounds, manganese compounds, copper compounds, zinc compounds, iron compounds, chromium compounds, nickel compounds, tin compounds, etc. As specific examples of these metal compounds, there can, for example, be mentioned chelate compounds such as zirconium acetylacetonate, cobalt acetylacetonate, aluminum acetylacetonate and manganese acetylacetonate; chelation reaction products of a compound having β- hydroxyamino structure with lead oxide (II); carboxylates such as lead 2-ethylhexanoic acid, lead naphthenate, lead octylate, lead benzoate, lead acetate, lead lactate, lead formate, lead glycolate and zirconium octylate; etc.

The above metal compounds can be used in an amount such that the metal content based on the resin solid matters is generally 10 wt. % or less, preferably 0.5 to 5 wt. %.

The resin composition for aqueous paint of this invention has an advantage that since hydrophilic parts due to tertiary amino groups neutralized with the acid, hydroxyl groups, etc., and hydrophobic parts comprising the other parts (for example, epoxy group parts) exist with clear distinction (being localized) in the resin skeleton of the component (A), the components (B) and (C) can readily be dispersed.

The resin composition for aqueous paint of this invention is crosslinked and cured through ether addition of the epoxy groups of the component (C) to the hydroxyl groups in the component (B) introduced by the phenolic hydroxyl groups and the alkanolamine and the hydroxyl groups in the component (A), etc., and since heating loss is extremely small at that time, the coating film formed has almost no contraction stress and smoothness, corrosion resistance, etc. are remarkably enhanced. Further, since the component (A) has excellent dispersibility, it is possible to hold its use amount at a low level and as a result basic concentration due to the resin composition for aqueous paint gets lower and the acid resistance, corrosion resistance, etc. of the coating film are improved.

There is no particular limitation about methods for formation of electrodeposition coating film on an electrically conductive substrate using a cationic electrodeposition coating composition using the composition of this invention as the base, and the formation can be carried out using usual cationic electrodeposition coating conditions. For example, if necessary, pigments, a curing catalyst and other additives are compounded in the electrodeposition coating composition, and a cationic electrodeposition bath is prepared having a bath concentration (solid component concentration) in the range of 5 to 40 wt. %, preferably 10 to 25 wt. % and a bath pH in the range of 4 to 8, preferably 5 to 7. At that time, it is preferable to use the substrate to be coated as the cathode and a stainless or carbon plate as the anode. Electrodeposition coating conditions are not particularly limited, but in general, it is preferable to carry out the electrodeposition under conditions of a bath temperature of 20° to 30° C., a voltage of 100 to 400 V, preferable 200 to 300 V, a current density of 0.01 to 3 A/dm$^2$, an electrification time of 1 to 5 minutes, an electrode area ratio (A/C) of 2/1 to $\frac{1}{2}$, a distance between the electrodes of 10 to 100 cm and a stirred state.

The above cationic electrodeposition coating composition of this invention is excellent in dispersibility in water, storage stability, bath stability, anticorrosive properties against untreated steel plates, smoothness, etc. because the component (A) is a cationic resin, the component (B) is a low basic resin, and the component (C) is a nonbasic resin. The electrodeposition coating composition can be applied onto a substrate such that at least the surface thereof has an electrically conductive metal. As such substrates, there can be mentioned car bodies, household appliances, business and office machines, building materials, structures, etc., but the substrates are not limited thereto.

This invention is further specifically described below according to examples and comparative examples. Parts and % therein are in principle weight parts and weight %, respectively.

I. Preparation of samples

1. Preparation examples of components (A) and (B)

These were prepared by reactions based on components and compounding amounts shown in Table 1. Preparation examples 1 to 4 are examples to prepare components (A) alone, and Preparation examples 5 to 7 are examples to prepare components (A) and (B) simultaneously.

In Preparation examples 1 to 4, the solvent and the component (A-1-1) to the component (A-3) shown in Table 1 were put in a flask equipped with a stirrer, a thermometer, a dropping funnel and a reflux condenser, the mixture was gradually heated with mixing by stirring and reacted at 150° C., and it was confirmed that the epoxy equivalent got to be 0, and thereby a component (A) was obtained.

In Preparation examples 5 to 7, the solvent and the component (A-1-1) to the component (A-2) shown in Table 1 were put in a flask equipped with a stirrer, a thermometer, a dropping funnel and a reflux condenser, the mixture was gradually heated with mixing by stirring and reacted at 120° C., it was confirmed that the epoxy equivalent reached the first stage end point epoxy equivalent, other components were then put therein, the mixture was reacted at 150° C., and it was confirmed that the epoxy equivalent got to be 0, and thereby a mixture of a component (A) and a component (B) was obtained.

TABLE 1

| Classi-fication | Component Name | Preparation example | | | | | | |
|---|---|---|---|---|---|---|---|---|
| | | 1 A-1 | 2 A-2 | 3 A-3 | 4 A-4 | 5 A-5 | 6 A-6 | 7 A-7 |
| Component (A) | | | | | | | | |
| Solvent | Ethylene glycol monobutyl ether | 397 | 692 | 534 | 520 | 330 | 468 | 397 |
| A-1-1 | EHPE-3150 | 900 | | | | 900 | | 900 |
| A-1-2 | BREN-S | | 1710 | | | | | |
| | DEN-438 | | | 1080 | | | 1080 | |
| | EOCN-102S | | | | 1290 | | | |
| A-2 | A-2-1 (*1) | 371 | 742 | 742 | 371 | | 371 | 371 |
| | Diethanolamine | 315 | 315 | 315 | 420 | 420 | 420 | 315 |
| First stage end point epoxy equivalent | | | | | | 1320 | 1871 | 1586 |
| A-3 | A-3-1 (*2) | 1651 | | | | | | |
| | A-3-2 (*3) | | 1733 | | | | | |
| | A-3-3 (*4) | | | 1870 | | | | |
| | A-3-4 (*5) | | | | 1983 | | | |

TABLE 1-continued

| Classification | Component Name | Preparation example | | | | | | |
|---|---|---|---|---|---|---|---|---|
| | | 1 A-1 | 2 A-2 | 3 A-3 | 4 A-4 | 5 A-5 | 6 A-6 | 7 A-7 |
| | A-3-5 (*6) | | | | | | 1805 | 9025 |
| | Component (B) | | | | | | | |
| Solvent | Ethylene glycol monobutyl ether | | | | | 1587 | 1321 | |
| Component | Diglycidyl ether of bisphenol A | | | | | 2470 | 3040 | |
| | Bisphenol A | | | | | 2730 | 1824 | |
| | Diethanolamine | | | | | | 420 | |
| | Diglycidyl ether of propylene glycol | | | | | 1140 | | |
| Characteristics | Component (A) | | | | | | | |
| | Content of (A-1) | 31 | 41 | 30 | 35 | 31 | 33 | 30 |
| | Primary hydroxyl group equivalent | 363 | 519 | 454 | 367 | 323 | 368 | 379 |
| | Amine value | 77 | 68 | 77 | 92 | 77 | 85 | 74 |
| | Number average molecular weight | 2907 | 1453 | 3633 | 3667 | 2906 | 3315 | 3030 |
| | Component (B) | | | | | | | |
| | Number average molecular weight | — | — | — | — | 1587 | 1321 | 1444 |
| | Phenolic hydroxyl group equivalent | — | — | — | — | 793 | 440 | 722 |

In Table 1
BREN-S: Bromine-modified novolak phenol polyglycidyl ether having a epoxy equivalent of 285 (produced by NIPPON KAYAKU CO., LTD.)
DEN-438: Novolak phenol polyglycidyl ether having an epoxy equivalent of 180 (produced by Dow Chemical Japan Co., Ltd.)
EOCN-102S: Cresol novolak phenol polyglycidyl ether having an epoxy equivalent of 215 (produced by NIPPON KAYAKU CO., LTD.)
Polypropylene glycol diglycidyl ether: having an epoxy equivalent of 380
EHPE-3150: Alicyclic type epoxy resin having an epoxy equivalent of 180 (produced by DAICEL CHEMICAL INDUSTRIES, LTD.)
Bisphenol A glycidyl ether: Epicoat 828 (produced by Yuka shell Epoxy Co., Ltd.)

(*1) A-2-1:

An amino compound obtained by putting 285 parts of stearic acid, 104 parts of hydroxyethylaminoethylamine and 80 parts of toluene in a reaction vessel equipped with a thermometer, a stirrer, a reflux condenser and a water separator, gradually heating then mixture with mixing by stirring, removing toluene according to necessity, separating and removing 18 parts of water formed by the reaction with temperature raise, and then removing the residual toluene under reduced pressure. Amine value 150, freezing point 76° C.

(*2) A-3-1:

A product obtained by putting 105 parts of diethanolamine, 760 parts of bisphenol A diglycidyl ether having an epoxy equivalent of 190, 456 parts of bisphenol A and 330 parts of ethylene glycol monobutyl ether in a flask equipped with a stirrer, a thermometer, a dropping funnel and a reflux condenser, and reacting the mixture at 150° C. until the residual amount of the epoxy groups gets to be 0. Solid component content 80%.

(*3) A-3-2:

A product obtained by putting 170 parts of phenylphenol, 760 parts of bisphenol A diglycidyl ether having an epoxy equivalent of 190, 456 parts of bisphenol A, 0.2 part of tetramethylammonium chloride and 346 parts of ethylene glycol monobutyl ether in a flask equipped with a stirrer, a thermometer, a dropping funnel and a reflux condenser, and reacting the mixture at 150° C. until the residual amount of the epoxy groups gets to be 0. Solid component content 80%.

(*3) A-3-3:

A product obtained by putting 280 parts of oleic acid, 760 parts of bisphenol A diglycidyl ether having an epoxy equivalent of 190, 456 parts of bisphenol A, 0.2 part of tetramethylammonium chloride and 374 parts of ethylene glycol monobutyl ether in a flask equipped with a stirrer, a thermometer, a dropping funnel and a reflux condenser, and reacting the mixture at 150° C. until the residual amount of the epoxy groups gets to be 0. Solid component content 80%.

(*3) A-3-4:

A product obtained by putting 370 parts of the above amine compound (A-2-1), 760 parts of bisphenol A diglycidyl ether having an epoxy equivalent of 190, 456 parts of bisphenol A, and 397 parts of ethylene glycol monobutyl ether in a flask equipped with a stirrer, a thermometer, a dropping funnel and a reflux condenser, and reacting the mixture at 150° C. until the residual amount of the epoxy groups gets to be 0. Solid component content 80%.

(*3) A-3-5:

A product obtained by putting 0.2 part of tetramethylammonium chloride, 760 parts of bisphenol A diglycidyl ether having an epoxy equivalent of 190, 684 parts of bisphenol A, and 361 parts of ethylene glycol monobutyl ether in a flask equipped with a stirrer, a thermometer, a dropping funnel and a reflux condenser, and reacting the mixture at 150° C. until the residual amount of the epoxy groups gets to be 0. Solid component content 80%.

2. Preparation examples of components (B)

(B-1):

100 parts of Shonol BRG-556 (trade name, novolak polyphenol produced by Showa Kobunshi Co., Ltd., phenolic hydroxyl equivalent 122) and 25 parts of ethylene glycol monobutyl ether were put in a flax equipped with a stirrer, a thermometer and a reflux condenser, and the mixture was heated to obtain (B-1) as a solution.

(B-2):

100 parts of Shonol CRG-951 (trade name, cresol novolak polyphenol produced by Showa Kobunshi Co., Ltd., phenolic hydroxyl equivalent 110) and 25 parts of ethylene glycol monobutyl ether were put in a flax equipped with a stirrer, a thermometer and a reflux condenser, and the mixture was heated to obtain (B-2) as a solution.

(B-3):

The above A-3-1 was used as such as (B-3).

(B-4):

The above A-3-5 was used as such as (B-4).

3- Preparation examples of components (C)

(C-1-1):

1917 parts of EPICLON N-695 (produced by DAINIPPON INK AND CHEMICALS, INCORPORATED, epoxy equivalent 213, $n \approx 7$), 590 parts of ethylene glycol monobutyl ether, 440 parts of nonylphenol (active hydrogen-containing compound) and 0.2 part of tetramethylammonium chloride were put in a flask equipped with a stirrer, a thermometer and a reflux condenser, and the mixture was reacted at 150° C. until the epoxy equivalent got to be 350, whereby (C-1-1) was obtained.

(C-1-2):

1917 parts of EPICLON N-695 (produced by DAINIPPON INK AND CHEMICALS, INCORPORATED, epoxy equivalent 213, $n \approx 7$), 620 parts of ethylene glycol monobutyl ether, 560 parts of tall oil fatty acid (active hydrogen-containing compound) and 0.2 part of tetramethylammonium chloride were put in a flask equipped with a stirrer, a thermometer and a reflux condenser, and the mixture was reacted at 150° C. until the epoxy equivalent got to be 370, whereby (C-1-2) was obtained.

(C-1-3):

100 parts of EPICLON N-695 (produced by DAINIPPON INK AND CHEMICALS, INCORPORATED, epoxy equivalent 213, $n \approx 7$) and 25 parts of ethylene glycol monobutyl ether were put in a flask equipped with a stirrer, a thermometer and a reflux condenser, and the mixture was heated to obtain (C-1-3) as a solution.

(C-1-4):

100 parts of BREN-S (produced by NIPPON KAYAKU CO., LTD., epoxy equivalent 280, $n \approx 2$) and 25 parts of ethylene glycol monobutyl ether were put in a flask equipped with a stirrer, a thermometer and a reflux condenser, and the mixture was heated to obtain (C-1-4) as a solution.

(C-1-5):

100 parts of ESBM-260 (produced by SUMITOMO CHEMICAL COMPANY, LIMITED, epoxy equivalent 260) and 25 parts of ethylene glycol monobutyl ether were put in a flask equipped with a stirrer, a thermometer and a reflux condenser, and the mixture was heated to obtain (C-1-5) as a solution.

(C-1-6):

100 parts of ESN-195 (produced by Nippon Steel Chemicals Co., Ltd., epoxy equivalent 290) and 25 parts of ethylene glycol monobutyl ether were put in a flask equipped with a stirrer, a thermometer and a reflux condenser, and the mixture was heated to obtain (C-1-6) as a solution.

(C-1-7):

122 parts of 2,6-xylenol (monofunctional phenol compound), 54 pars of o-cresol (bifunctional phenol compound), 28 parts of 7.6% aqueous formaldehyde solution and 4 parts of p-toluenesulfonic acid were put in a flask equipped with a stirrer, a thermometer and a reflux condenser, the mixture was heated to 100° C. and reacted under reflux for 4 hours, 300 parts of toluene and 8.4 parts of 10% aqueous NaOH solution were added, the mixture was stirred, and the toluene layer was separated and concentrated under reduced pressure to obtain 164 parts of 2,6-xylenol- and o-cresol-cocondensed novolak.

Then 750 parts of epichlorohydrin was added, the mixture was heated to 100° C., 120 parts of 50% aqueous NaOH solution was added dropwise over a period of 5 hours, and water in the system was removed by azeotropy with epichlorohydrin. After completion of the reaction, excess epichlorohydrin was removed under reduced pressure, the product was dissolved in 300 parts of toluene, the salt as a by-product was separated and removed, toluene was removed by reduced pressure to obtain 200 part of a 2,6-xylenol- and o-cresol-cocondensed novolak glycidyl ether resin. Its epoxy equivalent was 210.

100 parts of the synthesized 2,6-xylenol- and o-cresol-cocondensed novolak glycidyl ether resin and 25 parts of ethylene glycol monobutyl ether were put in a flask equipped with a stirrer, a thermometer and a reflux condenser, and the mixture was heated to obtain (C-1-7) as a solution.

(C-2-1):

32.6 parts of EHPE 3150 (epoxy equivalent 175–195, produced by DAICEL CHEMICAL INDUSTRIES, LTD.) and 8.2 parts of propylene glycol monomethyl ether were heated at 100° C. to obtain as a solution 40.8 parts of a resin for curing (C-2-1) having a solid content of 80% and an epoxy equivalent of 190. The number average molecular weight of the resin was about 1,500.

(C-2-2):

200 parts of 10% ethyl acetate solution of BF$_3$-etherate was added dropwise at 50° C. over a period of 4 hours to 136 parts of vinylnorbornene oxide, 124 parts of 4-vinylcyclohexene-1-oxide and 18 parts of trimethylolpropane to carry out ring opening polymerization. Ethyl acetate was added, the mixture was washed with water, and the ethyl acetate layer was concentrated. 130 parts of ethyl acetate was newly added to the concentrate to dissolve it, 160 parts of peracetic acid was added dropwise thereto at 50° C. over a period of 4 hours as an ethyl acetate solution, and the mixture was aged further at 50° C. for 2 hours to carry out epoxidation reaction. After removal of acetic acid, ethyl acetate and peracetic acid, the residue was dissolved in 500 parts of ethyl acetate at 40° C., the solution was washed four times with 250 parts of distilled water, and then ethyl acetate was removed. The residue was dissolved in 78 parts of propylene glycol monomethyl ether at 80° C. to obtain a resin for curing (C-2-2) having a solid content of 80% and an epoxy equivalent of 202. The number average molecular weight of the resin was about 1,300.

(C-2-3):

200 parts of 10% ethyl acetate solution of BF$_3$-etherate was added dropwise at 50° C. over a period of 4 hours to 304 parts of partially epoxidized product of limonene (2-methyl-4-isopropenyl-1-cyclohexene oxide) and 18 parts of trimethylolpropane. Subsequent operations were carried out in the same manner as in the case of the resin B-2 for curing, and the resultant product was dissolved in 80 parts of ethylene glycol monobutyl ether at 80° C. to obtain a resin for curing (C-2-3) having a solid content of 80% and an epoxy equivalent of 205. The number average molecular weight of the resin was about 1,000.

(C-2-4):

The same operations as in the case of the resin for curing (C-2-2) were made using 304 parts of 2,4- or 1,4-dimethyl-4-ethenyl-1-cyclohexene oxide to obtain a resin for curing (C-2-4) having a solid content of 80% and an epoxy equivalent of 199. The number average molecular weight of the resin was about 950.

(C-2-5):

0.1 part of distilled water was added to 460 parts of Celoxide, 3,000

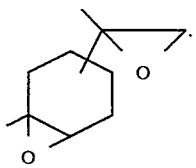

(trade name, produced by DAICEL CHEMICAL INDUSTRIES, LTD.), 0.3 part of aluminum acetylacetonate and 5 parts of tetraethoxysilane, the mixture was held at 80° C. for 1 hour and then reacted at 120° C. for 3 hours, and 116 parts of ethylene glycol monobutyl ether was added to obtain a resin for curing (C-2-5) having a solid content of 80% and an epoxy equivalent of 280. The number average molecular weight of the resin was about 1,100.

(C-2-6):

132 parts of the dimer of cyclopentadiene was dissolved in 70 parts of ethyl acetate, 160 parts of peracetic acid was added dropwise thereto at 35° C. over a period of 7 hours as an ethyl acetate solution, and the mixture was then aged at 40° C. for 6 hours. After removal of acetic acid, ethyl acetate and peracetic acid, the residue was dissolved in 500 parts of ethyl acetate at 40° C., the solution was washed five times each with 250 parts of distilled water, ethyl acetate was removed, and the residue was dissolved in 43 parts of methyl isobutyl ketone at 80° C. to obtain a compound (1) having a solid content of 80% and an epoxy equivalent of 90.

94 parts of 4-vinylcyclohexene was dissolved in 75 parts of ethyl acetate, 160 parts of peracetic acid was added dropwise, as an ethyl acetate solution, thereto at 50° C. over a period of 4 hours, and the mixture was then aged at 50° C. for 2 hours. After the removal of acetic acid, ethyl acetate and peracetic acid, the residue was dissolved in 500 parts of ethyl acetate at 40° C. and washed five times each with 250 parts of distilled water, ethyl acetate was removed, and the residue was dissolved in 32 parts of methyl isobutyl ketone at 80° C. to obtain a compound (2) having a solid content of 80% and an epoxy equivalent of 65.

0.2 part of aluminum acetylacetonate and 10 parts of trimethylolpropane were added to 225 parts of the compound (1) and 163 parts of the compound (2), the mixture was held at 100° C. for 1 hour and reacted at 150° C. for 3 hours, 60 parts of ethylene glycol monobutyl ether was added, and the mixture was cooled to obtain a resin for curing (C-2-6) having a solid content of 70% and an epoxy equivalent of 210. The number average molecular weight of the resin was 1,100.

(C-2-7):

A solution of 2 parts of azobisdimethylvaleronitrile in 33.4 parts of METHB (3,4-epoxycyclohexylmethyl methacrylate) was added dropwise over a period of 2 hours to a mixed solvent of 10 parts of methyl isobutyl ketone and 10 parts of butylcellosolve heated to 100° C., and the mixture was aged for 1 hour, heated to 125° C. and further aged at that temperature for 1 hour to obtain 54 parts of solution for curing (C-2-7) having a solid content of 60% and an epoxy equivalent of 196. The number average molecular weight of the resin was 10,000.

(C-2-8):

A solution of 2.4 parts of azobisdimethylvaleronitrile in the mixture of 32.0 parts of METHB monomer with 8.0 parts of hydroxyethyl acrylate was added dropwise over a period of 2 hours to 24 parts of butylcellosolve heated to 100° C., and the mixture was aged for 1 hour, heated to 125° C. and further aged at that temperature for 1 hour to obtain 64.8 parts of a resin for curing (C-2-8) having a solid content of 60% and an epoxy equivalent of 245. The number average molecular weight of the resin was 12,000.

(C-2-9):

A solution of 2.4 parts of azobisdimethylvaleronitrile in the mixture of 37 parts of 3,4-epoxycyclohexylmethyl acrylate with 3 parts of hydroxyethyl acrylate was then treated in the same manner as in the case of the resin curing (C-2-8) to obtain a resin for curing (C-2-9) having a solid content of 60% and an epoxy equivalent of 200. The number average molecular weight of the resin was about 15,000.

(c-3-1):

100 parts of N,N-diglycidyl-o-toluidine (produced by NIPPON KAYAKU CO., LTD., GOT) and 25 parts of ethylene glycol monobutyl ether were put in a flask equipped with a stirrer, a thermometer and a reflux condenser, and the mixture was heated to obtain (C-3-1) as a solution. The solid content was 80%, and the epoxy equivalent was 117.

(C-3-2):

100 parts of N,N,N',N'-tetraglycidyl-4,4'-diaminodiphenylmethane (produced by Japan Ciba-Geigy Co., MY720) and 25 parts of ethylene glycol monobutyl ether were put in a flask equipped with a stirrer, a thermometer and a reflux condenser, and the mixture was heated to obtain (C-3-2) as a solution. The solid content was 80%, and the epoxy equivalent was 115.

(C-3-3):

100 parts of N,N,N',N'-tetraglycidyl-3,3'-dimethyl-4,4'-diaminodiphenylmethane (produced by Japan Ciba-Geigy Co., MY722) and 25 parts of ethylene glycol monobutyl ether were put in a flask equipped with a stirrer, a thermometer and a reflux condenser, and the mixture was heated to obtain (C-3-3) as a solution. The solid content was 80%, and the epoxy equivalent was 125.

(C-3-4): for comparison 100 parts of N,N,N',N'-tetraglycidyl-m-xylylenediamine (TETRA-X produced by MITSUBISHI GAS CHEMICAL COMPANY INC.) and 25 parts of ethylene glycol monobutyl ether were put in a flask equipped with a stirrer, a thermometer and a reflux condenser, and the mixture was heated to obtain (C-3-4) as a solution. The solid content was 80%, and the epoxy equivalent was 101.

(C-3-5): for comparison 250 parts of MDI (4,4'-diphenylmethane diisocyanate) was put in a flask equipped with a stirrer, a thermometer and a reflux condenser and melted with heating at 80° C. A mixture of 130 parts of 2-ethylhexyl alcohol with 134 parts of diethylene glycol monoethyl ether was added thereto with retention of 80° C. over a period of 60 minutes. The mixture was then heated to 120° C., it was confirmed by IR (infrared analysis) that absorption due to the isocyanato group vanished, and thereafter 128.5 parts of ethylene glycol monobutyl ether was compounded to obtain (C-3-5). The solid content was 80%, and the blocked isocyanate equivalent was 257.

II. Examples and Comparative examples

The above samples were mixed and dispersed based on the compounding amounts shown in the following Tables 2 to 4 to prepare compositions of this invention and compositions for comparison.

TABLE 2

| | Component A | | Component B | | Component C | | Formic acid | Lead octenoate | Deionized water | Note |
|---|---|---|---|---|---|---|---|---|---|---|
| | Name | Amount | Name | Amount | Name | Amount | | | | |
| Example | | | | | | | | | | |
| 1 | A-1 | 19 | B-3 | 50 | | | 0.7 | 2.6 | 114 | Emulsion mixing |
| | A-2 | 19 | | | C-1-1 | 38 | 0.5 | | 93 | |
| 2 | A-3 | 19 | B-4 | 50 | | | 0.7 | 2.6 | 114 | Emulsion mixing |
| | A-4 | 19 | | | C-1-2 | 38 | 0.5 | | 93 | |
| 3 | A-5 | 69 | | | | | 0.7 | 2.6 | 114 | Emulsion mixing |
| | A-1 | 19 | | | C-1-3 | 38 | 0.5 | | 93 | |
| 4 | A-6 | 75 | | | | | 0.7 | 2.6 | 124 | Emulsion mixing |
| | A-1 | 13 | | | C-1-4 | 38 | 0.5 | | 83 | |
| 5 | A-7 | 63 | | | | | 0.6 | 2.6 | 104 | Emulsion mixing |
| | A-2 | 25 | | | C-1-5 | 38 | 0.5 | | 104 | |
| 6 | A-5 | 88 | | | C-1-6 | 38 | 1.2 | 2.6 | 207 | |
| 7 | A-6 | 88 | | | C-1-7 | 38 | 1.2 | 2.6 | 207 | |
| 8 | A-1 | 31 | B-2 | 13 | C-1-8 | 38 | 1.2 | 2.6 | 207 | |
| | | | B-3 | 31 | | | | | | |
| 9 | A-2 | 38 | B-1 | 13 | C-1-9 | 38 | 1.2 | 2.6 | 207 | |
| | | | B-4 | 38 | | | | | | |
| Comparative example | | | | | | | | | | |
| 1 | A-1 | 38 | B-5 | 50 | C-1-1 | 38 | 1.2 | 2.6 | 207 | |
| 2 | A-8 | 38 | B-3 | 44 | C-1-1 | 44 | 1.2 | 2.6 | 207 | |
| 3 | A-6 | 88 | | | C-10 | 38 | | 2.6 | | DBTDL* Added in an amount of 1.2 |

*DBTDL = Dibutyltin dilaurate

TABLE 2

| | Component A | | Component B | | Component C | | Formic acid | Lead octenoate | Deionized water | Note |
|---|---|---|---|---|---|---|---|---|---|---|
| | Name | Amount | Name | Amount | Name | Amount | | | | |
| Example | | | | | | | | | | |
| 10 | A-1 | 19 | B-3 | 50 | | | 0.7 | 2.6 | 114 | Emulsion mixing |
| | A-2 | 19 | | | C-2-1 | 38 | 0.5 | | 93 | |
| 11 | A-3 | 19 | B-4 | 50 | | | 0.7 | 2.6 | 114 | Emulsion mixing |
| | A-4 | 19 | | | C-2-2 | 38 | 0.5 | | 93 | |
| 12 | A-5 | 69 | | | | | 0.7 | 2.6 | 114 | Emulsion mixing |
| | A-1 | 19 | | | C-2-3 | 38 | 0.5 | | 93 | |
| 13 | A-6 | 75 | | | | | 0.7 | 2.6 | 124 | Emulsion mixing |
| | A-1 | 13 | | | C-2-4 | 38 | 0.5 | | 83 | |
| 14 | A-7 | 63 | | | | | 0.6 | 2.6 | 104 | Emulsion mixing |
| | A-2 | 25 | | | C-2-5 | 38 | 0.5 | | 104 | |
| 15 | A-5 | 88 | | | C-2-6 | 38 | 1.2 | 2.6 | 207 | |
| 16 | A-6 | 88 | | | C-2-7 | 38 | 1.2 | 2.6 | 207 | |
| 17 | A-1 | 31 | B-2 | 13 | C-2-8 | 38 | 1.2 | 2.6 | 207 | |
| | | | B-3 | 31 | | | | | | |
| 18 | A-2 | 38 | B-1 | 13 | C-2-9 | 38 | 1.2 | 2.6 | 207 | |
| | | | B-4 | 38 | | | | | | |
| Comparative example | | | | | | | | | | |
| 4 | A-1 | 38 | B-5 | 50 | C-2-1 | 38 | 1.2 | 2.6 | 207 | |
| 5 | A-8 | 38 | B-3 | 44 | C-2-1 | 44 | 1.2 | 2.6 | 207 | |
| 6 | A-6 | 88 | | | C-10 | 38 | | 2.6 | | DBTDL* Added in an amount of 1.2 |

*DBTDL = Dibutyltin dilaurate

TABLE 2

| | Component A | | Component B | | Component C | | Formic acid | Lead octenoate | Deionized water | Note |
|---|---|---|---|---|---|---|---|---|---|---|
| | Name | Amount | Name | Amount | Name | Amount | | | | |
| Example | | | | | | | | | | |
| 19 | A-1 | 19 | B-3 | 50 | | | 0.7 | 2.6 | 114 | Emulsion mixing |
| | A-2 | 19 | | | C-3-1 | 38 | 0.5 | | 93 | |
| 20 | A-3 | 19 | B-4 | 50 | | | 0.7 | 2.6 | 114 | Emulsion mixing |
| | A-4 | 19 | | | C-3-2 | 38 | 0.5 | | 93 | |
| 21 | A-5 | 69 | | | | | 0.7 | 2.6 | 114 | Emulsion mixing |
| | A-1 | 19 | | | C-3-3 | 38 | 0.5 | | 93 | |
| 22 | A-6 | 75 | | | | | 0.7 | 2.6 | 124 | Emulsion mixing |
| | A-1 | 13 | | | C-3-1 | 38 | 0.5 | | 83 | |

TABLE 2-continued

|    | Component A |        | Component B |        | Component C |        | Formic | Lead oc- | Deio-nized |                |
|----|------|--------|------|--------|-------|--------|------|------|-------|----------------|
|    | Name | Amount | Name | Amount | Name  | Amount | acid | tenoate | water | Note           |
| 23 | A-7  | 63     |      |        |       |        | 0.6  | 2.6  | 104   | Emulsion mixing |
|    | A-2  | 25     |      |        | C-3-2 | 38     | 0.5  |      | 104   |                |
| 24 | A-5  | 88     |      |        | C-3-3 | 38     | 1.2  | 2.6  | 207   |                |
| 25 | A-6  | 88     |      |        | C-3-1 | 38     | 1.2  | 2.6  | 207   |                |
| 26 | A-1  | 31     | B-2  | 13     | C-3-2 | 38     | 1.2  | 2.6  | 207   |                |
|    |      |        | B-3  | 31     |       |        |      |      |       |                |
| 27 | A-2  | 38     | B-1  | 13     | C-3-3 | 38     | 1.2  | 2.6  | 207   |                |
|    |      |        | B-4  | 38     |       |        |      |      |       |                |
| Comparative example |
| 7  | A-1  | 38     | B-5  | 50     | C-3-1 | 38     | 1.2  | 2.6  | 207   |                |
| 8  | A-8  | 38     | B-3  | 44     | C-3-1 | 44     | 1.2  | 2.6  | 207   |                |
| 9  | A-6  | 88     |      |        | C-3-4 | 38     | 1.2  | 2.6  | 207   |                |
| 10 | A-6  | 88     |      |        | C-10  | 38     |      | 2.6  |       | DBTDL* Added in amount of 1.2 |

*DBTDL = Dibutyltin dilaurate

In Tables 2 to 4,

1) Mixing and dispersion of components were carried out using a disper.
2) Compounding amounts of components include those of solvents.
3) The names of the components (A) and the same with those mentioned in the preparation examples in Table 1, and among them A-5 to A-7 contain the components (B), too.
4) The component (B-5) in Comparative examples 1, 4 and 7 contains no phenol group and has a higher amine value, and was obtained by putting 371 parts of the amine compound (A-2-1), 105 parts of diethanolamine, 950 parts of bisphenol A diglycidyl ether, 342 parts of bisphenol A and 442 parts of ethylene glycol monobutyl ether in a flask equipped with a stirrer, a thermometer, a dropping funnel and a reflux condenser, and the reacting the mixture at 150° C. until the residual epoxy group amount got to be 0, and its solid content was 80%.
5) (A-8) in Comparative examples 2, 5 and 8 is a component (A) containing neither component (A-1-1) nor component (A-1-2), and its preparation process is as follows.

21 parts of diethanolamine, 950 parts of bisphenol A diglycidyl ether having an epoxy equivalent of 190, 340 parts of polypropylene glycol diglycidyl ether having an epoxy equivalent of 340 and 2052 parts of bisphenol A were put in a flask equipped with a stirrer, a thermometer, a dropping funnel and a reflux condenser, and the mixture was gradually heated with mixing by stirring and reacted at 120° C. After the epoxy equivalent was confirmed to be 980, 479 parts of ethylene glycol monobutyl ether was added. While the temperature of the system was maintained at 100° C., 158 parts of diethanolamine and 43 parts of the amino compound (A-2-1) were added, and the mixture was reacted until rise in the viscosity ceased, whereby a resin for comparison (A-8) was obtained having a solid content of 80%, an amine value of 54 and a primary hydroxyl group equivalent of 518.

6) (C-10) in comparative examples 3, 6 and 10 was obtained by putting 250 parts of diphenylmethane diisocyanate in a flask equipped with a stirrer, a thermometer and a reflux condenser, heating the mixture to 80° C., adding dropping a mixture of 130 parts of 2-ethylhexyl alcohol with 134 parts of diethylene glycol monobutyl ether over a period of 60 minutes, heating the mixture to 120° C., confirming by IR that absorption due to free NCO groups vanished, and then adding 128.5 parts of ethylene glycol monobutyl ether.

7) (C-3-4) in comparative example 9 is a component (C-3) wherein the structure represented by the formula (V) does not directly bind to a carbon atom of the aromatic ring.

Preparation example of pigment dispersion paste (Y-1)

20 parts of titanium white (Tipeck CR93 produced by ISHIHARA SANGYO KAISHA, LTD.), 2 parts of carbon (MA-7 produced by Mitsubishi Chemical Industries Limited), 4 parts of aluminum tripolyphosphate (K white 84 produced by Teikoku Kako Co., Ltd.), 24 parts of clay (Geaklite produced by Geaklite Chemical Co., Ltd.), 0.4 part of acetic acid and 39.6 parts of deionized water were added to 10 parts of the cationic resin (A-1), the mixture was kneaded, and 200 parts of glass beads were added and dispersed by a paint shaker to obtain a pigment dispersion paste (Y-1) wherein grits contained had a size of 10μ or smaller as a value measured by a grindometer and which has a solid content of 58%.

Preparation of electrodeposition coating composition 75 parts of the pigment dispersion paste (Y-1) was mixed with 333 parts of each of the emulsions obtained in Tables 2 to 4, and 310 parts of deionized water was added to obtain electrodeposition coating compositions having a solid content of 20%.

Performance test

Measurement results are shown in arrangement in the following Tables 5 to 7 of the dispersion particle sizes and MEQ stabilities of the above resin compositions (emulsions) as well as the heating losses and salt spray resistances of the coating films formed using the above electrodeposition coating compositions.

TABLE 5

|         | Dispersion particle size | MEQ stability (milliequivalent) | | Heating loss (%) | Salt spray resistance |
|---------|------|-------|-------|------|------|
|         |      | Initial stage | After storage | | |
| Example |      |      |      |      |      |
| 1       | 0.2  | 24.5 | 22.2 | 3.0  | ◯    |
| 2       | 0.2  | 25.3 | 24.0 | 2.8  | ◎    |
| 3       | 0.15 | 24.4 | 21.5 | 3.8  | ◯    |
| 4       | 0.1  | 25.3 | 23.3 | 2.9  | ◎    |
| 5       | 0.15 | 24.8 | 24.0 | 3.3  | ◯    |
| 6       | 0.1  | 26.3 | 25.3 | 3.8  | ◎    |
| 7       | 0.1  | 26.0 | 24.8 | 4.5  | ◎    |
| 8       | 0.25 | 25.8 | 25.1 | 4.0  | ◯    |
| 9       | 0.25 | 25.0 | 23.7 | 3.5  | ◯    |

TABLE 5-continued

| | Dispersion particle size | MEQ stability (milliequivalent) Initial stage | MEQ stability (milliequivalent) After storage | Heating loss (%) | Salt spray resistance |
|---|---|---|---|---|---|
| 10 | 0.2 | 26.3 | 25.0 | 4.2 | ○ |
| Comparative example | | | | | |
| 1 | 0.15 | 24.8 | 19.5 | 4.3 | X |
| 2 | 0.6< | 25.0 | 21.5 | 4.0 | ○ |
| 3 | 0.20 | 26.4 | 26.7 | 15.2 | ○ |

TABLE 6

| | Dispersion particle size | MEQ stability (milliequivalent) Initial stage | MEQ stability (milliequivalent) After storage | Heating loss (%) | Salt spray resistance |
|---|---|---|---|---|---|
| Example | | | | | |
| 10 | 0.18 | 25.5 | 24.8 | 4.1 | ○ |
| 11 | 0.19 | 25.6 | 25.0 | 3.5 | ○ |
| 12 | 0.15 | 24.8 | 24.6 | 4.2 | ○ |
| 13 | 0.12 | 24.9 | 24.4 | 3.3 | ○ |
| 14 | 0.20 | 25.2 | 25.2 | 3.8 | ○ |
| 15 | 0.10 | 27.3 | 27.0 | 4.2 | ○ |
| 16 | 0.15 | 26.6 | 26.0 | 5.0 | ○ |
| 17 | 0.22 | 25.9 | 26.0 | 5.1 | ○ |
| 18 | 0.23 | 23.0 | 22.8 | 3.9 | ○ |
| 19 | 0.18 | 25.3 | 25.0 | 5.1 | ○ |
| Comparative example | | | | | |
| 4 | 0.12 | 25.2 | 25.1 | 4.4 | X |
| 5 | 0.6< | 26.0 | 25.8 | 4.2 | ○ |
| 6 | 0.20 | 26.4 | 26.7 | 15.2 | ○ |

TABLE 7

| | Dispersion particle size | MEQ stability (milliequivalent) Initial stage | MEQ stability (milliequivalent) After storage | Heating loss (%) | Salt spray resistance |
|---|---|---|---|---|---|
| Example | | | | | |
| 20 | 0.25 | 25.5 | 23.3 | 2.8 | ○ |
| 21 | 0.22 | 25.4 | 23.3 | 2.9 | ○ |
| 22 | 0.21 | 24.5 | 22.5 | 2.5 | ○ |
| 23 | 0.15 | 25.4 | 23.4 | 2.9 | ○ |
| 24 | 0.20 | 24.9 | 23.9 | 3.0 | ○ |
| 25 | 0.13 | 26.6 | 25.6 | 2.9 | ○ |
| 26 | 0.14 | 24.8 | 23.9 | 4.0 | ○ |
| 27 | 0.20 | 25.9 | 25.0 | 3.5 | ○ |
| 28 | 0.25 | 24.4 | 23.4 | 3.5 | ○ |
| Comparative example | | | | | |
| 7 | 0.20 | 24.4 | 24.2 | 4.0 | X |
| 8 | 0.6< | 25.5 | 24.5 | 4.0 | ○ |
| 9 | 0.21 | 26.3 | 17.5 | 3.5 | ○ |
| 10 | 0.20 | 26.4 | 26.7 | 15.2 | ○ |

In Tables 5 to 7, (1) Dispersion particle size:

The diameters of particles of the emulsions (those after a lapse of 12 hours starting from their preparation) obtained based on the compounding of the above Tables 2 to 4 and having a solid content of 30% were measured using a Nanosizer N-4 produced by Coulter Co.

(2) MEQ stability:

About 10 g each of the emulsions obtained based on the compounding in the Tables 2 to 4 and having a solid content of 30% (containing no pigment paste) after a lapse of 12 hours starting from the preparation (initial stage) and those after closed storage at 30° C. for 20 days were accurately weighed, and subjected to titration by a potentiometric titration apparatus using 1/10N-KOH alcoholic solution to determine the amounts of the acids contained, and MEQ values were calculated according to the following equation. Emulsions exhibiting only a small change after the storage against the initial value are good.

MEQ (milliequivalent)=[Titration amount (ml) with the KOH alcoholic solution × 10]/[Sample amount (g)×0.3]

(3) Heating loss

The weight of a zinc phosphate-treated steel plate is expressed as $W_0$, and the treated plate was electrodeposition coated with the above electrodeposition coating composition under the above conditions so that the thickness of the cured coating film got to be 20μ, and the coating film was dried in a vacuum desiccator under reduced pressure at 80° C. for 1 hour. The weight of the coated steel plate is expressed as $W_1$. The plate was then baked with heating at 180° C. for 30 minutes in an oven. The weight of the resultant plate is expressed as $W_2$. Heating loss was calculated from these values according to the following equation.

Heating loss (%) = $[(W_1-W_2)/(W_1-W_0)] \times 100$ (4) Salt spray resistance:

An untreated steel plate was electrodeposition coated with the above electrodeposition coating composition under the above conditions so that the thickness of the cured coating film got to be 20μ, and heated at 160° C. for 10 minutes to cure the coating film. This coated plate was subjected to the salt spray resistance test according to JIS Z2871 (time 600 hours). The resultant coating film was judged to stand the test (○) when the creek width (one side) from the cut of the coating film (linear cut reaching the bare surface) was within 2.00 mm and the blister of the coating film of the parts other than the cut part was 8F (ASTM) or less, and judged not to stand the test (X) when they were above the values.

What is claimed is:

1. A resin composition for aqueous paint which contains as main components
   (A) a resin substantially containing neither a primary or secondary amino group nor an epoxy group and obtained by reacting an epoxy resin (A-1-1) having per molecule at least three epoxy group-containing functional groups represented by the following formula (I)

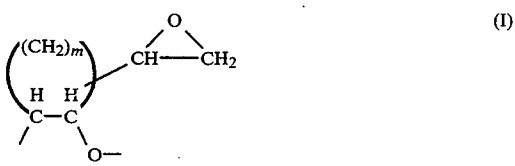

wherein m is an interger of 2 to 4, and/or a novolak phenol glycidyl ether group-containing resin (A-1-2), having per molecule at least three glycidyl ether groups and represented by the following formula (II)

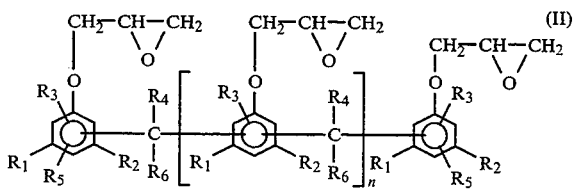 (II)

wherein
- $R_1$ and $R_2$, which are the same or different, independently represent a hydrogen atom, an alkyl group having 1 to 8 carbon atoms, an aryl group, an aralkyl group or a halogen atom,
- $R_3$ represents a hydrogen atom, an alkyl group having 1 to 10 carbon atoms, an aryl group, an aralkyl group, an allyl group or a halogen atom,
- $R_4$ and $R_6$, which are the same or different, independently represent a hydrogen atom or an alkyl group having 1 to 4 carbon atoms,
- $R_5$ represents a hydrogen atom, an alkyl group having 1 to 10 carbon atoms, an aryl group, an aralkyl group, an allyl group op a halogen atom, and
- n is an integer of 1 to 38, a primary or secondary amine compound (A-2) having per molecule at least one primary hydroxyl group, and a phenol compound (A-3) having per molecule at least one phenolic hydroxyl group;

(B) a resin (B-1) containing per molecule at least two phenolic hydroxyl groups and substantially containing neither primary nor secondary amino groups or a resin (B-2) containing per molecule at least two in total of phenolic hydroxyl groups and primary hydroxyl groups originating from an alkanolamine and substantially containing neither primary nor secondary amino groups; and (C) at least one component selected from the group consisting of a novolak phenol glycidyl ether group-containing resin (C-1) represented by the following formula (III)

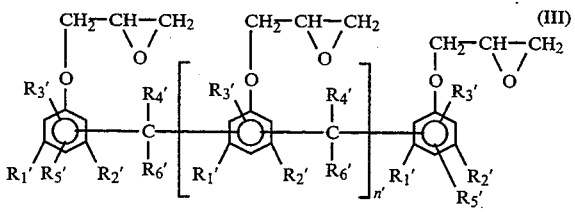 (III)

wherein
- $R'_1$ and $R'_2$, which are the same or different, independently represent a hydrogen atom, an alkyl group having 1 to 8 carbon atoms, an aryl group, an aralkyl group or a halogen atom,
- $R'_3$ represents a hydrogen atom, an alkyl group having 1 to 10 carbon atoms, an aryl group, an aralkyl group, an allyl group or a halogen atom,
- $R'_4$ and $R'_6$, which are the same or different, independently represent a hydrogen atom or an alkyl group having 1 to 4 carbon atoms,
- $R'_5$ represents an alkyl group having 1 to 10 carbon atoms, an aryl group, an aralkyl group, an alkyl group or a halogen atom, and
- n' is an integer of 1 to 38, an epoxy resin (C-2) having per molecule at least three epoxy group-containing functional groups represented by the following formula (IV)

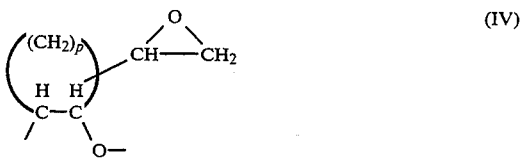 (IV)

wherein p is an integer of 2 to 4, and a compound (C-3) having Rer molecule two or more glycidyl group originating from glycidylamino group directly binding to the carbon atom of the aromatic ring and represented by the following formula (V)

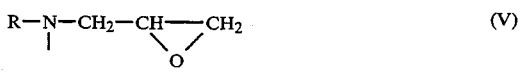 (V)

wherein R is a hydrogen atom or a glycidyl group.

2. The composition as claimed in claim 1, wherein the epoxy resin (A-1-1) is obtained by ring opening polymerizing a vinylcycloalkylene oxide represented by the following formula (VI)

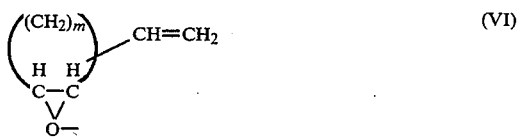 (VI)

wherein m is as defined in claim 1, optionally together with another epoxy group-containing compound, in the presence of an active hydrogen-containing organic compound as an initiator, to form a polyether polyol resin, and then epoxidizing with an oxidizing agent vinyl groups existing in the side chains of the resin and originating in the above vinylcycloalkylene oxide.

3. The composition as claimed in claim 1, wherein the epoxy resin (A-1-1) has an epoxy equivalent in the range of 140 to 1,000.

4. The compound as claimed in claim 2, wherein the vinylcylcoalkylene oxide is 4-vinylcyclohexene-1-oxide.

5. The composition as claimed in claim 1, wherein the glycidyl ether group-containing resin (A-1-2) has a number average molecular weight within the range of about 400 to about 8,000 as measured by a vapor pressure-osmotic pressure method.

6. The composition as claimed in claim 1, wherein the glycidyl ether group-containing resin (A-1-2) has in average 3.5 to 10 glycidyl groups per molecule.

7. The composition as claimed in claim 1, wherein the glycidyl ether group-containing resin (A-1-2) has an epoxy equivalent within the range of 180 to 2,000.

8. The composition as claimed in claim 1, wherein, in the formula (II), $R_1$ and $R_2$ independently represent a hydrogen atom, a methyl group, a chlorine atom or a bromine atom; $R_3$ and $R_5$ independently represent a methyl group, a tert-butyl group, a nonyl group, a phenyl group, a chlorine atom or a bromine atom; $R_4$ and $R_6$ independently represent a hydrogen atom, and n is an integer of 3 to 25.

9. The composition as claimed in claim 1, wherein said amine compound (A-2) is a substance selected from the group consisting of monoalkanolamine, N-alkylalkanolamine, dialkanolamine, addition product of monoalkanolamine with an α,β-unsaturated carbonyl compound, hydroxyalkylaminoalkylamine, hydroxyethylamine, a condensate of a ketone compound with hydroxyethylamine, hydroxyethylhydrazine or hydroxybutylhydrazine, and an amine compound represented by the formula (XIII) below

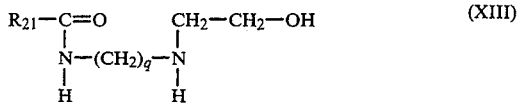

wherein q is an interger of 1 to 6;

$R_{21}$ is hydrocarbon chain having 4 to 36 carbon atoms which may contain a hydroxyl group and/or a polymerizable unsaturated group.

10. The composition as claimed in claim 6, wherein said amine compound (A-2) is selected from the group consisting of N-alkylalkanolamine, dialkanolamine, addition product of monoalkanolamine with an α,β-unsaturated carbonyl compound, and an amine compound represented by the formula (XIII) above.

11. The composition as claimed in claim 6, wherein said amine compound (A-2) is a mixture of one amine compound represented by the formula (XIII) and diethanolamine.

12. The composition as claimed in claim 1, wherein said phenol compound (A-3) contains at least 1, per molecule of structural units represented by formula (XIV) below (XIV)

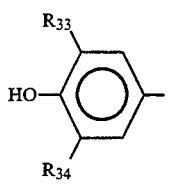

wherein $R_{33}$ and $R_{34}$, which are the same or different, independently represent a hydrogen atom, an alkyl group having 1 to 10 carbon atoms, an aryl group, an aralkyl group, an allyl group or a halogen atom.

13. The composition as claimed in claim 1, wherein said phenol compound (A-3) is selected from the group consisting of bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, 1,1,2,2,-tetrakis(4-dihydroxyphenyl)ethane, 4,4'-dihydroxydiphenyl ether, 4,4'-dihydroxydiphenylsulfone, phenol-novolak, and cresol-novolak or is a monophenol compound.

14. The composition as claimed in claim 1, wherein said phenol compound (A-3) has in average 0.3 to 3 phenolic hydroxyl group-containing functional groups per molecule, said functional group being represented by the formula (XV) below

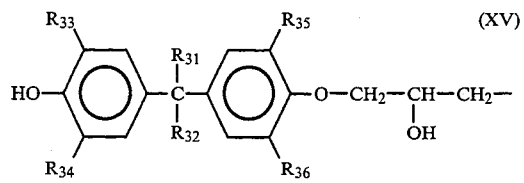

wherein $R_{31}$ and $R_{32}$, which are the same or different, independently represent an alkyl group having 1 to 4 carbon atoms; and $R_{33}$ and $R_{36}$, which are the same or different, independently represent a hydrogen atom, an alkyl group having 1 to 10 carbon atoms, an aryl group, an aralkyl group, an allyl group or a halogen atom.

15. The composition as claimed in claim 11, wherein said phenol compound (A-3) has a number average molecular weight within the range of 200 to 20,000.

16. The composition as claimed in claim 11, wherein said phenol compound (A-3) is bis(4-hydroxyphenyl)-2,2-propane or bis(4-hydroxyphenyl)methane.

17. The composition as claimed in claim 1, wherein said phenol compound is a compound represented by formula (XVI) below

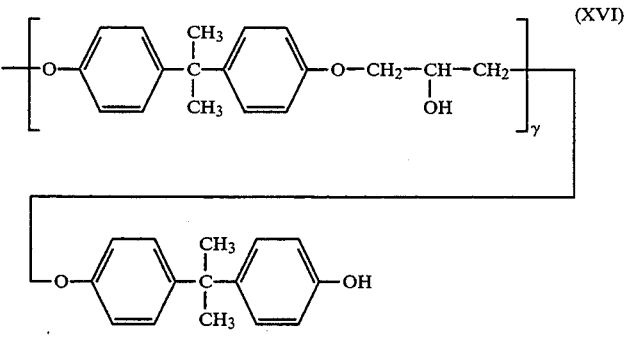

wherein

γ is 0 or an integer of 1 to 7; and $R_{38}$ represents a residual group of an active hydrogen-containing compound.

18. The composition as claimed in claim 1, wherein the resin (A-1-1) and/or (A-1-2) is present in an amount of 0.5 to 75% by weight based on the total weight of said components (A-1-1), (A-1-2), (A-2) and (A-3).

19. The composition as claimed in claim 1, wherein said amine compound (A-2) is present in a proportion such that hydroxy group equivalent of the component (A) is within the range of 250 to 2,000.

20. The composition as claimed in claim 1, wherein said phenol compound (A-3) is present in an amount with the range of 0.05 to 1.5 moles per mole of the resin (A-1-1) and/or (A-1-2).

21. The composition as claimed in claim 1, wherein said component (A) has a number average molecular weight within the range of 1,000 to 200,000.

22. The composition as claimed in claim 1, wherein said component (A) has a hydroxy group equivalent within the range of 250 to 2,000 and an amine value within the range of 15 to 200.

23. The composition as claimed in claim 1, wherein said component (B) has a number average molecular weight within the range of about 200 to about 20,000.

24. The composition as claimed in claim 1, wherein said resin (B-1) containing per molecular at least two phenolic hydroxy groups and substantially containing neither primary nor secondary amino groups is one having per molecule 2 to 38 phenolic hydroxyl groups.

25. The composition as claimed in claim 24, wherein said resin (B-1) is selected from the group consisting of bis(4-hydroxyphenyl)-2,2-propane(bisphenol A), bis(4-hydroxyphenyl)-2,2-methane(bisphenol F), 4,4'-dihydroxybiphenyl, 4,4'-(1-α-methylbenzylidyne)bisphenol, 2,2'-bis(4-hydroxy-3-methylphenyl)propane, methylenebis-p-cresol, 4,4'-ethylidenebisphenol, bis(4-hydroxy-3,5-dimethylphenyl)methane, 2,2-bis(4-hydroxy-3,5-dimethylphenyl)propane, dihydroxybenzophenone, 1,1-bis(4-hydroxyphenyl)cyclohexane, 4,4'4''-methylidenetrisphenol, 4,4'-[(4-hydroxphenyl)-methylene]bis[2-methoxyphenol], 4,4'-[(4-hydroxyphenyl)methylene]bis [2,6-dimethylphenol], 4,4'4''-ethylidenetrisphenol, 4,4'[1-[4-(2-(4-hydroxyphenyl)-2-propyl)phenyl]ethylidene]bisphenol and phenolic novolak resins represented by the following formula (XVII)

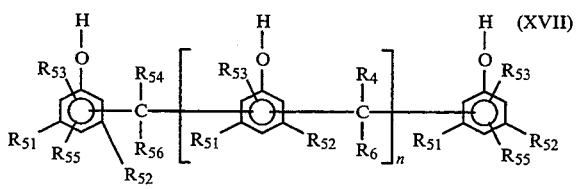

wherein
R$_{51}$ and R$_{52}$, which are the same or different, independently represent a hydrogen atom, an alkyl group having 1 to 8 carbon atoms, an aryl group, an aralkyl group or a halogen atom;
R$_{53}$ represents a hydrogen atom, an alkyl group having 1 to 10 carbon atoms, an aryl group, an aralkyl group, an allyl group or a halogen atom;
R$_{54}$ and R$_{56}$, which are the same or different, independently represent a hydrogen atom or an alkyl group having 1 to 4 carbon atoms;
R$_{55}$ represents a hydrogen atom, an alkyl group having 1 to 10 carbon atoms, an aryl group, an aralkyl group, an allyl group or a halogen atom; and
s is an integer of 1 to 38,
and reaction products of these compounds with mono- or polyglycidyl compounds.

26. The composition as claimed in claim 1, wherein said resin (B-2) containing per molecule at least two in total of phenolic hydroxy groups and primary hydroxy groups containing in an alkanolamine, and substantially containing neither primary nor secondary amino groups is one obtained reacting a resin (B-1) described in claim 24, a polyglycidyl compound and an alkanolamine.

27. The composition as claimed in claim 1, wherein said novolak phenol type glycidyl ether group-containing resin (C-1) has a number average molecular weight within the range of about 8,000 as measured by a vapor pressure-osmotic pressure method.

28. The composition as claimed in claim 1, wherein said novolak phenol type glycidyl ether group-containing resin (C-1) has per molecular 3.5 to 10 glycidyl groups on an average.

29. The composition as claimed in claim 1, wherein said novolak phenol type glycidyl ether group-containing resin (C-1) has an epoxy equivalent within the range of 180 to 2,000.

30. The composition as claimed in claim 1, wherein in the formula (III), R'$_1$ and R'$_2$ independently represent a hydrogen atom, a methyl group, a chlorine atom or a bromine atom; R'$_3$ and R'$_5$ independently represent a methyl group, a tert-butyl group, a nonyl group, a phenyl group, a chlorine atom or a bromine atom; R'$_4$ and R'$_6$ independently represent a hydrogen atom, and s is an integer of 3 to 25.

31. The composition as claimed in claim 1, wherein said epoxy resin (C-2) is obtained by ring opening polymerizing a vinylcycloalkylene oxide represented by the following formula

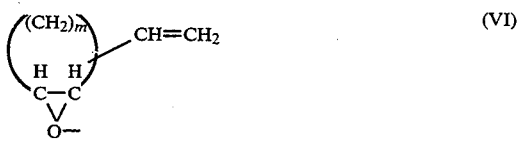

wherein p is as defined in claim 1, optionally together with another epoxy group-containing compound, in the presence of an active hydrogen-containing organic compound as an initiator, to form a polyether polyol resin, and then epoxidizing with an oxidizing agent vinyl groups existing in the side chains of the resin and originating in the above vinylcycloalkylene oxide.

32. The composition as claimed in claim 1, wherein said epoxy resin (C-2) has an epoxy equivalent within the range of 140 to 1,000.

33. The composition as claimed in claim 31, wherein the vinylcycloalkylene oxide is 4-vinylcyclohexene-1-oxide.

34. The composition as claimed in claim 1, wherein said compound (C-3) is obtained by binding epihalohydrin to the amino group of an aniline derivative through dehydrohalogenation reaction.

35. The composition as claimed in claim 34, wherein the aniline derivative is selected from the group consisting of aniline, o-toluidine, m-toluidine, p-toluidine, o-ethylaniline, m-ethylaniline, p-ethylaniline, p-cresidine, 2,4-xylidine, 3,4-xylidine, o-anisidine, p-anisidine, naphthylamine, phenylenediamine, 2,4-toluylenediamine, diaminobenzanilide, dianisidine, diaminodiphenyl ether, 3,5-diaminochlorobenzene, 3,3'-dimethylbenzidine and 1,5-naphthylenediamine.

36. The composition as claimed in claim 1, wherein said compound (C-3) has a number average molecular weight within the range of about 200 to about 8,000 as measured by a vapor pressure-osmotic pressure method.

37. The composition as claimed in claim 1, wherein said compound (C-3) has an epoxy equivalent within the range of 100 to 2,000.

38. The composition as claimed in claim 1, which contains 10 to 60 wt. % of the component (A) and 90 to 40 wt. % of the total of the component (B) and the component (C), based on the total solid component weight of the components (A), (B) and (C).

39. The composition as claimed in claim 1, wherein the glycidyl group (epoxy groups) of said component (C) exist in an amount within the range of 0.3 to 3 moles per mole in total of hydroxy groups contained in the components (A) and (B).

40. The composition as claimed in claim 1, wherein the component (A) is neutralized with an acid.

41. A cationic electrodeposition coating composition comprising the resin composition for aqueous paint claimed in claim 1.

42. An article coated with the cationic electrodeposition coating composition comprising claimed in claim 41.

43. The composition as claimed in claim 11, wherein the amine compound represented by the formula (XIII) is a hydroxyethylaminoethyl fatty amide.

44. The composition as claimed in claim 12 wherein said phenol compound (A-3) contains 1 to 4 per molecule of structural units represented by formula (XIV).

45. The composition as claimed in claim 14 wherein said phenol compound (A-3) is a monophenol compound selected from the group consisting of phenol, nonylphenol, α-naphthol, β-naphthol, p-tert-octylphenol, o-phenylphenol and p-phenylphenol.

46. The composition as claimed in claim 25 wherein the said resin (B-1) is one having per molecule 2 to 15 phenolic hydroxyl groups.

* * * * *